United States Patent
Kura

(10) Patent No.: US 10,230,938 B2
(45) Date of Patent: Mar. 12, 2019

(54) DISPLAY SYSTEM, DISPLAY DEVICE, AND RELAY DEVICE

(75) Inventor: Jumpei Kura, Kanagawa (JP)

(73) Assignee: Sony Corporation (JP)

(*) Notice: Subject to any disclaimer, the term of this patent is extended or adjusted under 35 U.S.C. 154(b) by 937 days.

(21) Appl. No.: 14/002,237

(22) PCT Filed: Mar. 2, 2012

(86) PCT No.: PCT/JP2012/055324
§ 371 (c)(1),
(2), (4) Date: Aug. 29, 2013

(87) PCT Pub. No.: WO2012/121128
PCT Pub. Date: Sep. 13, 2012

(65) Prior Publication Data
US 2013/0336631 A1  Dec. 19, 2013

(30) Foreign Application Priority Data

Mar. 6, 2011 (JP) .................. 2011-048423

(51) Int. Cl.
*H04N 13/189* (2018.01)
*H04N 13/344* (2018.01)
(Continued)

(52) U.S. Cl.
CPC ....... *H04N 13/189* (2018.05); *G02B 27/0172* (2013.01); *G09G 3/003* (2013.01);
(Continued)

(58) Field of Classification Search
None
See application file for complete search history.

(56) References Cited

U.S. PATENT DOCUMENTS

| 2006/0017657 A1* | 1/2006 | Yamasaki | ............ G02B 27/017 345/8 |
| 2009/0231721 A1 | 9/2009 | Kajita et al. | |
| 2010/0103077 A1 | 4/2010 | Sugiyama et al. | |

FOREIGN PATENT DOCUMENTS

| EP | 2046026 A1 | 4/2009 |
| JP | 3336687 B2 | 10/2002 |

(Continued)

OTHER PUBLICATIONS

"Maestro M3 Home Theater Processor User Functionality Manual", Dec. 31, 2009 (Dec. 31, 2009), XP055132275, Retrieved from the Internet: URL:http://www.sound-better.net/Support/Manuals/Home/ MaestroM3_Manual.pdf.pdf. p. 9 part "HDMI Inputs and Outputs", p. 18 part "HDMI signals", p. 30, setting "Auto-Priority Out 1/Out 2".*

(Continued)

*Primary Examiner* — Heather R Jones
(74) *Attorney, Agent, or Firm* — Lerner, David, Littenberg, Krumholz & Mentlik, LLP

(57) ABSTRACT

A reproduction signal output from a reproduction device is output via a relay device to two or more display devices including an excellent display device that is used by being mounted on the head of a user.

A connection monitoring circuit in a front end box 40 monitors both a +5V signal of a source appliance that is HDMI-connected to an HDMI input unit 501, and an HPD signal of a sink appliance that is HDMI-connected to a second output unit 503. Then, only when an HPD signal emitted by the HDMI sink appliance is detected together with a +5V signal emitted by the HDIM source appliance does the connection monitoring circuit in the front end box 40 enables a repeater function with respect to the HDMI sink appliance.

1 Claim, 24 Drawing Sheets

(51) Int. Cl.
| | |
|---|---|
| G02B 27/01 | (2006.01) |
| H04N 13/04 | (2006.01) |
| H04N 21/41 | (2011.01) |
| H04N 21/4363 | (2011.01) |
| G09G 5/00 | (2006.01) |
| G09G 5/12 | (2006.01) |
| H04N 5/775 | (2006.01) |
| G09G 3/00 | (2006.01) |
| H04N 13/30 | (2018.01) |

(52) U.S. Cl.
CPC ............... *G09G 5/006* (2013.01); *G09G 5/12* (2013.01); *H04N 5/775* (2013.01); *H04N 13/04* (2013.01); *H04N 13/30* (2018.05); *H04N 13/344* (2018.05); *H04N 21/4122* (2013.01); *H04N 21/43635* (2013.01); *G02B 2027/014* (2013.01); *G02B 2027/0118* (2013.01); *G02B 2027/0123* (2013.01); *G02B 2027/0127* (2013.01); *G02B 2027/0134* (2013.01); *G02B 2027/0178* (2013.01); *G02B 2027/0187* (2013.01); *G09G 2370/12* (2013.01)

(56) References Cited

FOREIGN PATENT DOCUMENTS

| JP | 2003076353 A | 3/2003 | | |
|---|---|---|---|---|
| JP | 2006-005804 A | 1/2006 | | |
| JP | 2006005804 A | * 1/2006 | ............... | H04N 5/64 |
| JP | 2007-133415 A | 5/2007 | | |
| JP | 2010-081001 A | 4/2010 | | |
| JP | 2010113138 A | 5/2010 | | |

OTHER PUBLICATIONS

"Maestro M3 Home Theater Processor User Functionality Manual", Dec. 31, 2009 (Dec. 31, 2009), XP055132275, Retrieved from the Internet: URL:http://www.sound-better.net/Support/Manuals/Home/MaestroM3_Manual.pdf.pdf. [Retrieved on Jul. 29, 2014] p. 9 part "HDMI Inputs and Outputs", p. 18 part "HDMI signals", p. 30, setting "Auto-Priority Out 1/out 2".

"DisplayPort 1:2 Switch With Integrated TMDS Translator", Nov. 30, 2008 (Nov. 30, 2008), XP055132276, Retrieved from the Internet: URL:http://www.ti.com.cn/cn/lit/ds/slls939/slls939.pdf [Retrieved on Jul. 29, 2014] p. 1, p. 25 part "Switching logic" first paragraph.

Supplementary European Search Report from EP Application No. 12755685, dated Aug. 8, 2014.

Extended European Search Report for EP17196202.0 dated Jan. 22, 2018.

* cited by examiner

HEAD-MOUNTED DISPLAY 10

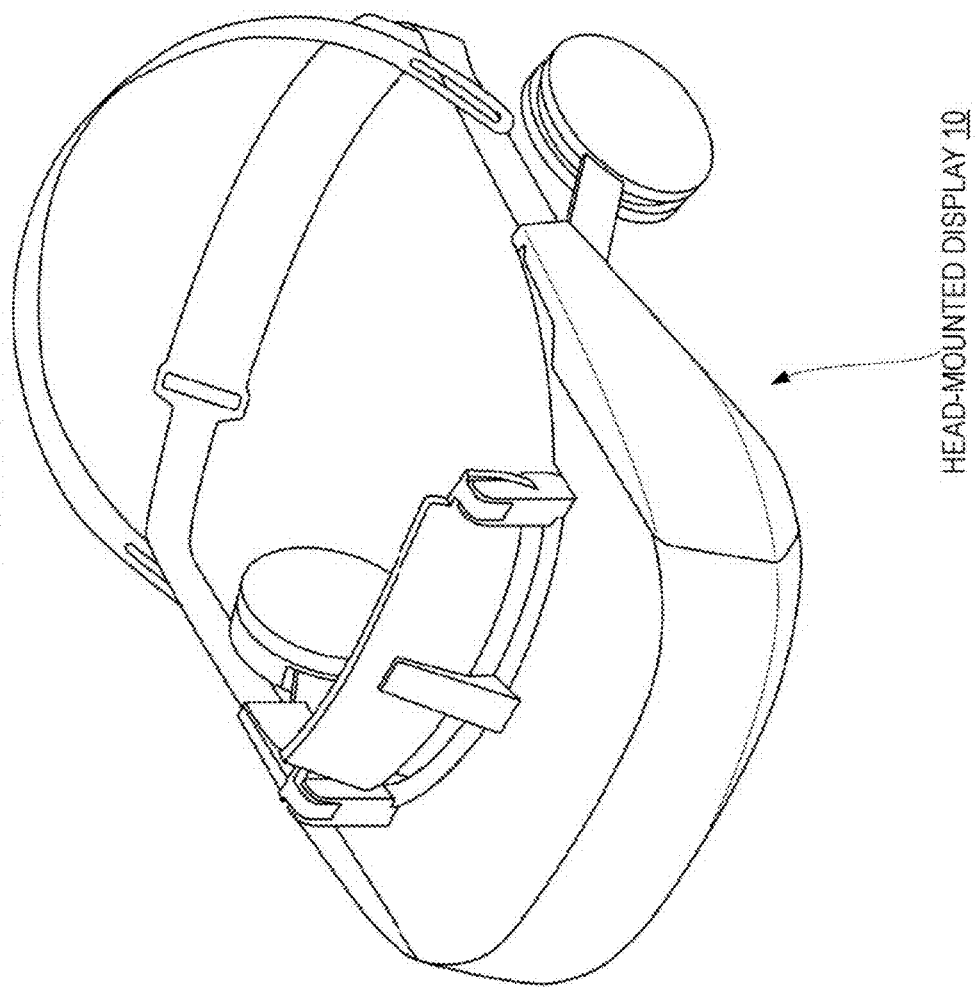

NATURAL IMAGE          GUI REGION

BLACK IMAGE DISPLAY REGION   4 : 3 DISPLAY IMAGE

BLACK IMAGE DISPLAY REGION   DISPLAY IMAGE OF CinemaScope SIZE

DISPLAY SYSTEM, DISPLAY DEVICE, AND RELAY DEVICE

CROSS-REFERENCE TO RELATED APPLICATION

The present application is a national phase entry under 35 U.S.C. § 371 of International Application No. PCT/JP2012/055324 filed Mar. 2, 2012, published on Sep. 13, 2012, as WO 2012/121128 A1, which claims priority from Japanese Patent Application No. JP 2011-48423 filed in the Japan Patent Office on Mar. 6, 2011.

TECHNICAL FIELD

The present invention relates to a display system that outputs reproduction signals output from a reproduction device to two or more display devices, a display device that is used being mounted on the head of a user, and a relay device that relays between the reproduction device and two or more display devices including the display device that is used being mounted on the head of a user.

BACKGROUND ART

A display device that is mounted on the head and used for viewing an image, i.e. a head-mounted display (HMD), is widely known. The head-mounted display includes display units for left and right eyes, and is configured to be able to control vision and hearing when a headphone is used in combination. If it is configured such that when mounted on the head, the outside world is completely shut out, the effect of virtual reality at the time of viewing is enhanced. Also, the head-mounted display is capable of showing different images to the left and right eyes, and if images with a disparity are displayed to the left and right eyes, a 3D image may be presented.

The head-mounted display is a display system for presenting a virtual image to a user (that is, for forming a virtual image on the retina of an eye). Here, the virtual image is formed on the side of an object in a case the object is at a position closer to a lens relative to the focal length.

In the case of making a user view a virtual image, the distance, for example, to the user for whom the virtual image is formed is preferably changed depending on the image. For example, there is proposed a display device that presents a virtual image in a manner suitable for an image (for example, see Patent Document 1). This display device includes a magnifying optical system that arranges the same virtual image to be observed by the left eye and the right eye of the user on the same plane, and controls the distance between the virtual image and the user and the size of the virtual image according to the aspect ratio of the image. For example, with an image of a movie or a drama with an aspect ratio of 16:9 according to high vision broadcasting, a large virtual image is formed on the retina at a position about 15 meters away from the user, and with an image of a television signal with an aspect ratio of 4:3 according to an NTSC (National Television System Committee) method, a medium-sized virtual image is formed on the retina at a relatively close position of about 3 meters away from the user, and the user is allowed to feel a sense of presence, and also, a sense of fatigue felt at the time of viewing a virtual image is reduced.

If an appropriate angle of view is set by an optical system while using high-resolution elements such as EL (Electro-Luminescence) elements for display units of a head-mounted display for the left and right eyes, and multiple channels are reproduced by a headphone, a sense of presence of as if viewing in a movie theater may be realized.

CITATION LIST

Patent Document

Patent Document 1: Japanese Patent Application Laid-Open No. 2007-133415

SUMMARY OF THE INVENTION

Problems to be Solved by the Invention

An object of the present invention is to provide an excellent display system that outputs reproduction signals output from a reproduction device to two or more display devices, an excellent display device that is used being mounted on the head of a user, and an excellent relay device that relays between the reproduction device and two or more display devices including the display device that is used being mounted on the head of a user.

Solutions to Problems

The present application was made in view of the above object, and in an embodiment the disclosed technology is a display system including: an image information supply device for supplying image information; a first display device for being mounted on and for being used by a user; one or more second display devices; and an output switching device for connecting the first display device and the second display device, and for outputting the image information supplied by the image information supply device preferentially to the first display device.

Note that the "system" here refers to a logical collection of a plurality of devices (or function modules for realizing specific functions), and each device or function module may be or may not be in a single housing.

Further, an embodiment of the present application is a display device including: amounting portion for being fixed to a head of a user; a user operation unit for being used by a user to perform an operation input; a display unit for a left eye for displaying an image for a left eye; a display unit for a right eye for displaying an image for a right eye; a signal processing unit for processing image signals to be displayed by the display unit for a left eye and the display unit for a right eye; a display control unit for controlling display driving of the display unit for a left eye and the display unit for aright eye; and an orbital processing unit for causing a GUI region to orbit, where the GUI region is for being superimposed on images to be displayed on the display unit for a left eye and the display unit for a right eye.

According to an embodiment of the present application, the orbital processing unit of the display device causes the GUI region to operate every time the GUI region is output or at every specific interval.

According to an embodiment of the present application, the orbital processing unit of the display device stops an orbital operation while a user is operating a GUI via the user operation unit.

Further, an embodiment of the present application is a display device including: a mounting portion for being fixed to a head of a user; a user operation unit for being used by a user to perform an operation input; a display unit for a left eye for displaying an image for a left eye; a display unit for a right eye for displaying an image for a right eye; a signal processing unit for processing image signals to be displayed by the display unit for a left eye and the display unit for a right eye; and a display control unit for controlling display driving of the display unit for a left eye and the display unit for a right eye, wherein a brightness correction parameter different for an image display region and a black image display region is set for screens of the display unit for a left eye and the display unit for a right eye for when images with a different aspect ratio are displayed, and a brightness correction process for an image signal is performed by the signal processing unit.

Further, an embodiment of the present application is a display device including: a mounting portion for being fixed to a head of a user; a user operation unit for being used by a user to perform an operation input; a display unit for a left eye for displaying an image for a left eye; a display unit for a right eye for displaying an image for a right eye; a signal processing unit for processing image signals to be displayed by the display unit for a left eye and the display unit for a right eye; and a display control unit for controlling display driving of the display unit for a left eye and the display unit for a right eye, wherein the display control unit causes timings for display data signals to be output, respectively, to the display unit for a left eye and the display unit for a right eye to be different.

According to an embodiment of the present application, the display control unit of the display device changes, between left and right, one of a phase, a frequency and a polarity of display data signals to be output, respectively, to the display unit for a left eye and the display unit for a right eye.

Further, an embodiment of the present application is a display device including: amounting portion for being fixed to a head of a user; a user operation unit for being used by a user to perform an operation input; a display unit for a left eye for displaying an image for a left eye; a display unit for a right eye for displaying an image for a right eye; a signal processing unit for processing image signals to be displayed by the display unit for a left eye and the display unit for a right eye; and a display control unit for controlling display driving of the display unit for a left eye and the display unit for a right eye, wherein the signal processing unit changes viewing peak brightness according to elapsed time from start of using of the device by a user.

According to an embodiment of the present application, the signal processing unit of the display device gradually reduces viewing peak brightness for dark adaptation that is higher than set viewing peak brightness that is normally set, to the set viewing peak brightness over specific time.

According to an embodiment of the present application, the signal processing unit of the display device adjusts the time over which the viewing peak brightness for dark adaptation is returned to the set viewing peak brightness, according to a dark adaptation characteristic of a user wearing the device.

According to an embodiment of the present application, the display device further includes a brightness sensor. Further, the signal processing unit adjusts the viewing peak brightness for dark adaptation according an amount of visible light in an outside world detected by the brightness sensor.

Further, an embodiment of the present application is a display device including: a mounting portion for being fixed to a head of a user; a mounting sensor for detecting mounting of the mounting portion to a head of a user; a user operation unit for being used by a user to perform an operation input; a display unit for a left eye for displaying an image for a left eye; a display unit for a right eye for displaying an image for a right eye; an optical system provided to each of the display unit for a left eye and the display unit for a right eye, the optical system having a designed predetermined visual distance to a virtual image; a signal processing unit for processing image signals to be displayed by the display unit for a left eye and the display unit for a right eye; and a display control unit for controlling display driving of the display unit for a left eye and the display unit for a right eye, wherein in response to detection of mounting by the mounting sensor, a splash screen including visual information serving as a clue for a user to feel the visual distance is displayed on the display unit for a left eye and the display unit for a right eye.

According to an embodiment of the present application, in the display device, the splash screen is a stereoscopic image of a state where a screen is being seen from a position of a seat in a movie theater before showing, or a stereoscopic image of a stage of a concert hall, and an image outside the screen of the movie theater or the stage of the concert hall is the visual information serving as a clue for a user to feel the visual distance.

Further, an embodiment of the present application is a display device including: amounting portion for being fixed to a head of a user; a user operation unit for being used by a user to perform an operation input; a display unit for a left eye for displaying an image for a left eye; a display unit for a right eye for displaying an image for a right eye; a signal processing unit for processing image signals to be displayed by the display unit for a left eye and the display unit for a right eye; and a display control unit for controlling display driving of the display unit for a left eye and the display unit for a right eye, wherein at a time of viewing of an image, an original image is displayed being reduced relative to a screen size, and visual information serving as a clue for a visual distance is displayed outside the original image.

Further, an embodiment of the present application is a display device including: a mounting portion for being fixed to a head of a user; an accelerometer for detecting acceleration acting on the device; a user operation unit for being used by a user to perform an operation input; a display unit for a left eye for displaying an image for a left eye; a display unit for a right eye for displaying an image for a right eye; a signal processing unit for processing image signals to be displayed by the display unit for a left eye and the display unit for a right eye; and a display control unit for controlling display driving of the display unit for a left eye and the display unit for a right eye, wherein an amount of motion of a head of a user is tracked based on a measurement result of the accelerometer, and image display regions of the display unit for a left eye and the display unit for a right eye are moved according to the amount of motion.

According to an embodiment of the present application, the display device further includes an optical system provided to each of the display unit for a left eye and the display unit for a right eye, the optical system having a designed predetermined visual distance to a virtual image. An amount of movement of the image display regions according to the amount of motion is determined based on the visual distance to the virtual image.

Further, an embodiment of the present application is a relay device including: an input unit for connecting a reproduction device, and for inputting a reproduction signal from the reproduction device; a first output unit for connecting a first display device and outputting the reproduction signal; a second output unit for connecting a second display device and outputting the reproduction signal; and an output switching unit for exclusively outputting the reproduction signal to the first output unit or the second output unit, and for preferentially performing output from the first output unit to the first display device, wherein the relay device relays between the reproduction device, and the first display device and the second display device.

According to an embodiment of the present application, the output switching unit of the relay device monitors a power state of the first display device via the second output unit, and outputs the reproduction signal from the first output unit to the first display device in response to turning on of power of the first display device, and outputs the reproduction signal from the second output unit to the second display device in response to turning off of power of the first display device.

According to an embodiment of the present application, the reproduction device and the input unit, and the second display device and the second output unit are connected by an HDMI interface. Further, the output switching unit of the relay device enables a repeater function of the input unit for the second output unit in response to detection of a +5V signal at the input unit.

According to an embodiment of the present application, the reproduction device and the input unit, and the second display device and the second output unit are connected by an HDMI interface. Further, the output switching unit of the relay device enables a repeater function of the input unit for the second output unit in response to detection of a +5V signal at the input unit and detection of an HPD signal at the second output unit.

Effects of the Invention

According to the present invention, it is possible to provide an excellent display system that outputs reproduction signals output from a reproduction device to two or more display devices, an excellent display device that is used being mounted on the head of a user, and an excellent relay device that relays between the reproduction device and two or more display devices including the display device that is used being mounted on the head of a user.

Other objects, characteristics and advantages of the present invention will be made clear by the detailed description based on the embodiment and accompanying drawings of the present invention described later.

BRIEF DESCRIPTION OF DRAWINGS

FIG. 3A is a perspective view of the head-mounted display 10 seen at an angle from the front left side.

MODE FOR CARRYING OUT THE INVENTION

Hereinafter, an embodiment of the present invention will be described in detail with reference to the drawings.

A. System Configuration

Figure 1:
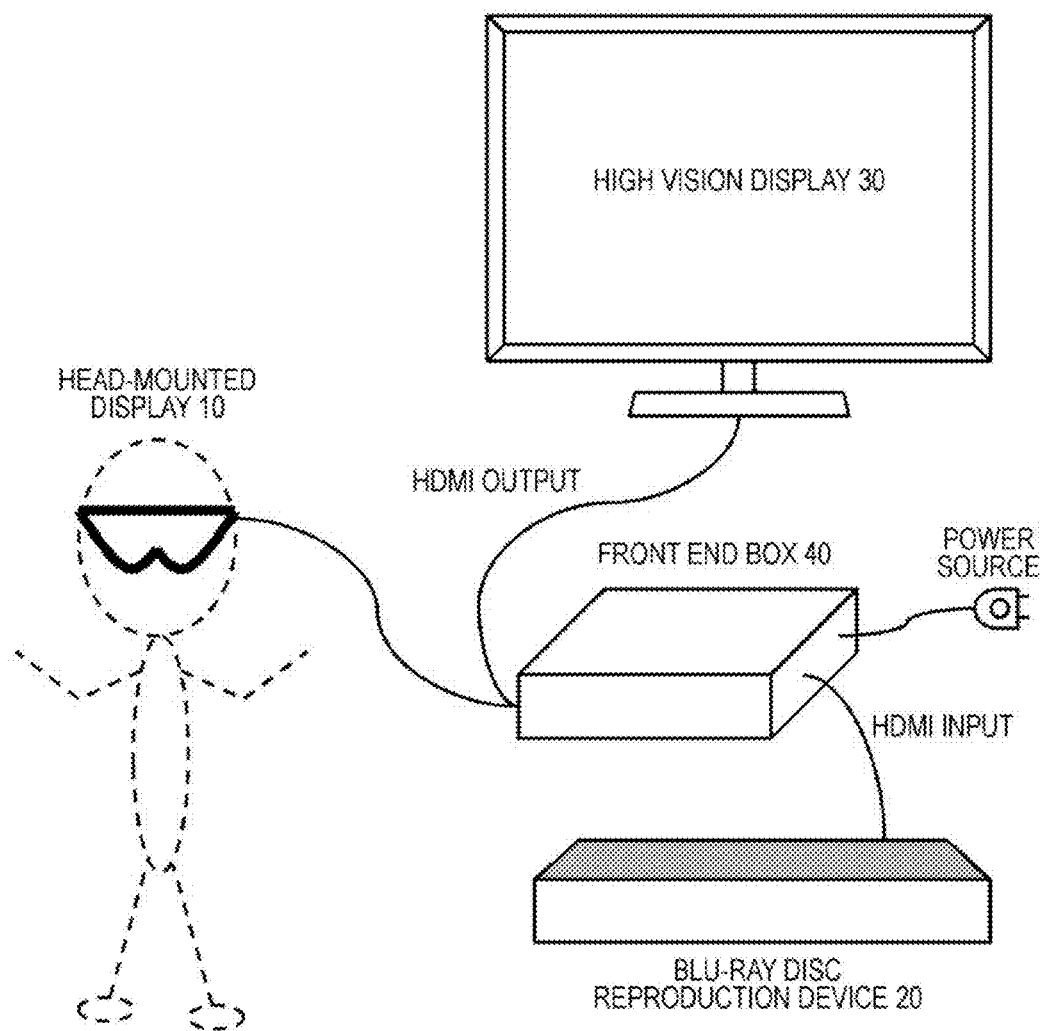
FIG. 1 is a diagram schematically showing a configuration of an image display system including a head-mounted display.

FIG. 1 schematically shows a configuration of an image display system including a head-mounted display. The system shown is configured from a main body of a head-mounted display 10, a Blu-ray disc reproduction device 20 to be a source of viewing content, a high vision display (an HDMI-compatible TV, for example) 30 to be another output destination of a reproduced content of the Blu-ray disc reproduction device 20, and a front end box 40 for processing an AV signal output from the Blu-ray disc reproduction device 20.

The front end box 40 corresponds to an HDMI repeater that, when an AV signal output from the Blu-ray disc reproduction device 20 is HDMI-input, performs signal processing and HDMI-outputs the signal, for example. Also, the front end box 40 is a two-output switcher for switching an output destination of the Blu-ray disc reproduction device 20 between the head-mounted display 10 and the high vision display 30.

In the example shown, the front end box 40 has two outputs, but three or more outputs may be included. However, with the front end box 40, the output destination of AV signals is exclusive, and the highest priority is on the output to the head-mounted display 10. When the power of the head-mounted display 10 is on, or when a user is using the head-mounted display 10, the AV signals are output only to the head-mounted display 10. In other words, the AV signals are output to the high vision TV 30 (or other display, not shown, that is connected to the front end box 40) with a low priority only when a user is not using the head-mounted display 10, such as when the power of the head-mounted display 10 is off, or when the head-mounted display 10 is not connected.

Additionally, the HDMI (High-Definition Multimedia Interface) is an interface standard for digital home appliances used mainly for transmission of audio and images, and is based on a DVI (Digital Visual Interface), and uses TMDS (Transition Minimized Differential Signaling) for a physical layer. The present system is compatible with HDMI 1.4, for example.

The Blu-ray disc reproduction device 20 and the front end box 40, and the front end box 40 and the high vision display 30 are connected by HDMI cables. A configuration is also possible where the front end box 40 and the head-mounted display 10 are connected by an HDMI cable, but in the present embodiment, they are connected by a proprietary cable, and the AV signals are serially transferred. However, the AV signals and power may be supplied by one cable connecting the front end box 40 and the head-mounted display 10, and the head-mounted display 10 may be supplied with drive power by this cable.

The head-mounted display 10 includes independent display units for the left eye and the right eye. Each display unit uses organic EL elements, for example. Also, each display unit is equipped with a wide viewing angle optical system of low distortion and high resolution.

Figure 2:
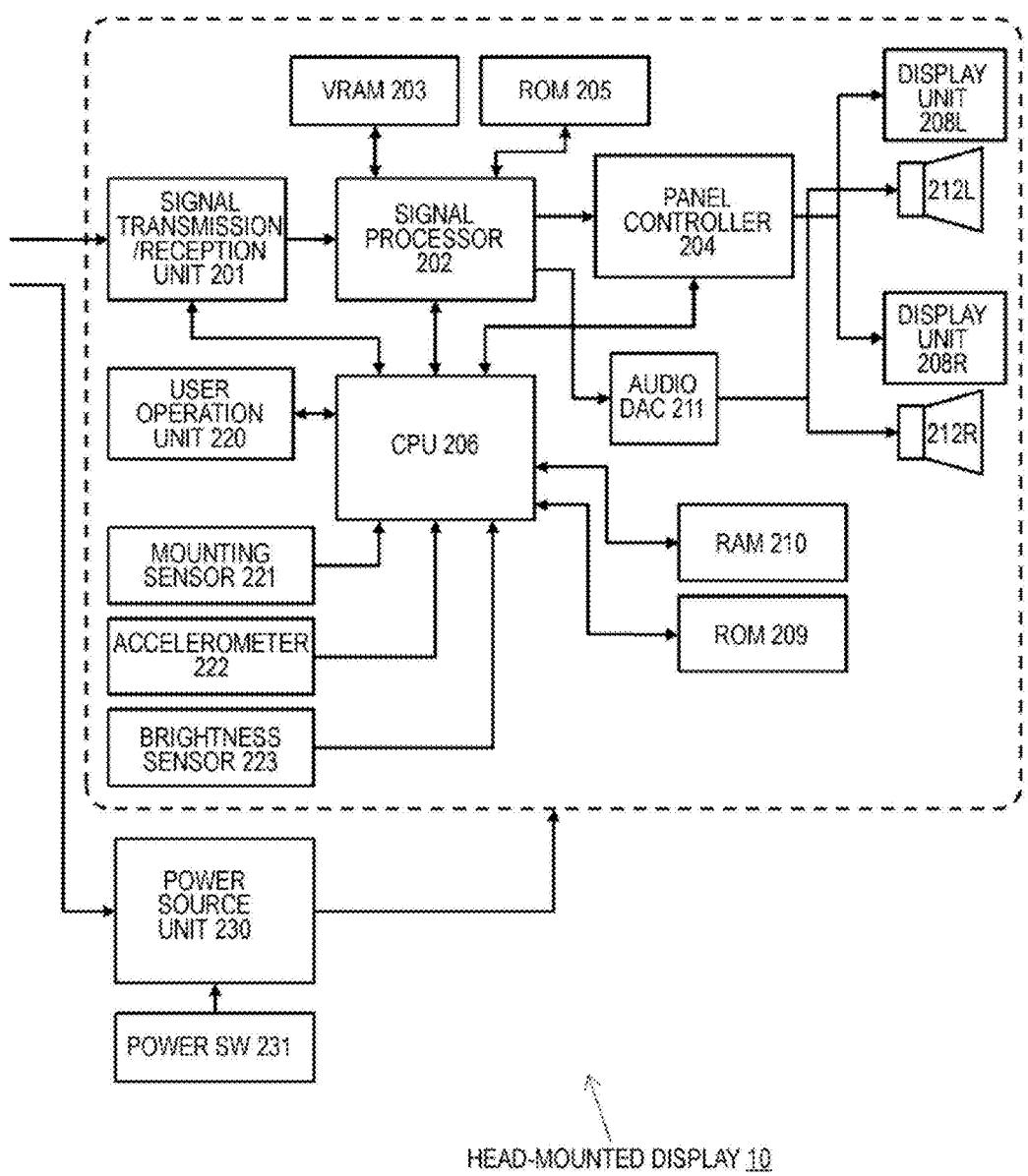
FIG. 2 is a diagram schematically showing an internal configuration of a head-mounted display 10.

FIG. 2 schematically shows an internal configuration of the head-mounted display 10.

A signal transmission/reception unit 201 receives AV signals or transmits information signals processed by a CPU via a cable connected to the front end box 40. In the present embodiment, since the AV signals are serially transferred via the cable, the signal transmission/reception unit 201 performs serial-parallel conversion on received signals.

A signal processor 202 separates an AV signal received by the signal transmission/reception unit 201 into an image signal and an audio signal, and performs image signal processing and audio signal processing on the signals.

An audio signal on which audio signal processing has been performed by the signal processor 202 is converted into an analog signal by an audio DAC (a digital-analog converter) 211, and is output from left and right speakers 212L and 212R.

The signal processor 202 performs, as the image signal processing, brightness level adjustment, contrast adjustment, and other image quality enhancements. Also, the signal processor 202 applies various types of processing on an original image signal based on an instruction from a CPU 206. For example, OSD (On Screen Display) information including text, figures and the like is generated, and is superimposed on the original image signal. Signal patterns necessary for generating the OSD information are stored in a ROM 205, and the signal processor 202 reads out information stored in the ROM 205. One example of the OSD information to be superimposed on the original image information is a GUI (Graphical Uer Interface) for adjusting output of audio, a screen and the like. Moreover, screen information generated by the image signal processing is temporarily stored in a VRAM (a frame memory) 203. If an image signal supplied by the front end box 40 is different for left and right, such as a stereoscopic image signal, the signal processor 202 separates the signal into the left and right image signals, and generates screen information.

Left and right display units 208L and 208R are each formed from a display panel formed from organic EL elements, and a gate driver and a data driver for driving the display panel. Also, the left and right display units 208L and 208R are each equipped with an optical system with a wide viewing angle. Additionally, the optical system is omitted from FIG. 2.

A panel controller 204 reads out the screen information from the VRAM 203 in predetermined display cycles, and converts the same into signals to be input to the display units 208L and 208R, and also, generates pulse signals such as horizontal synchronization signals or vertical synchronization signals to be used in the operation of the gate driver and the data driver.

The CPU 206 executes programs loaded on a RAM 210 from a ROM 209, and controls the overall operation of the head-mounted display 10 in an integrated manner. Also, the CPU 206 controls transmission/reception of information signals to and from the front end box 40 via the signal transmission/reception unit 201.

The main body of the head-mounted display 10 is equipped with a user operation unit 220 including one or more operators which a user can operate with a finger or the like. Although not shown, the operators is a combination of left, right, top and bottom cursor keys, and an enter key at the center, for example. The CPU 206 performs processing related to image output from the display units 208R and 208L, audio output from headphones 212L and 212R, and the like, according to instructions from a user input from the user operation unit 220.

Also, in the present embodiment, the head-mounted display 20 is equipped with a plurality of sensors such as a mounting sensor 221, an accelerometer 222, a brightness sensor 223 and the like. Outputs of these sensors are input to the CPU 206.

The mounting sensor 221 is configured from a mechanical switch or the like, for example (to be described later). The CPU 206 may determine, based on an output of the sensor, whether the head-mounted display 20 is mounted on a user, that is, whether the head-mounted display 20 is currently being used.

The accelerometer 222 includes three axes, for example, and detects the magnitude and direction of acceleration acting on the head-mounted display 20. The CPU 206 may track movement of the head of a user wearing the head-mounted display 10, based on acceleration information acquired. Also, the CPU 206 may control screens to be displayed on the display units 208L and 208R, according to the amount of movement of the head of the user (to be described later).

The brightness sensor 223 detects brightness of the environment where the head-mounted display 20 is currently placed. The CPU 206 may control brightness level adjustment to be applied to an image signal, based on brightness information acquired by the brightness sensor 223 (to be described later).

Furthermore, the CPU 206 transmits, where necessary, sensor information acquired from each sensor 221 from the signal transmission/reception unit 201 to the front end box 40.

A power source unit 230 supplies drive power supplied by the front end box 40 to each circuit component surrounded by a dashed line in FIG. 2. Also, the main body of the head-mounted display 10 is equipped with a power switch 231 which a user can operate with a finger or the like. The power source unit 230 switches between on and off of power supply to a circuit component according to operation of the power switch 231.

Additionally, a state where the power is turned off by the power switch 231 is a "standby" state of the head-mounted display 10 where the power source unit 230 is waiting in a power supplied state. Moreover, the front end box 40 side may determine whether it is a used state, that is, a state where each circuit component is supplied with power and is operating, or an unused state, based on a change in a voltage level of a signal line connected to the power source unit 230.

Figure 3B:
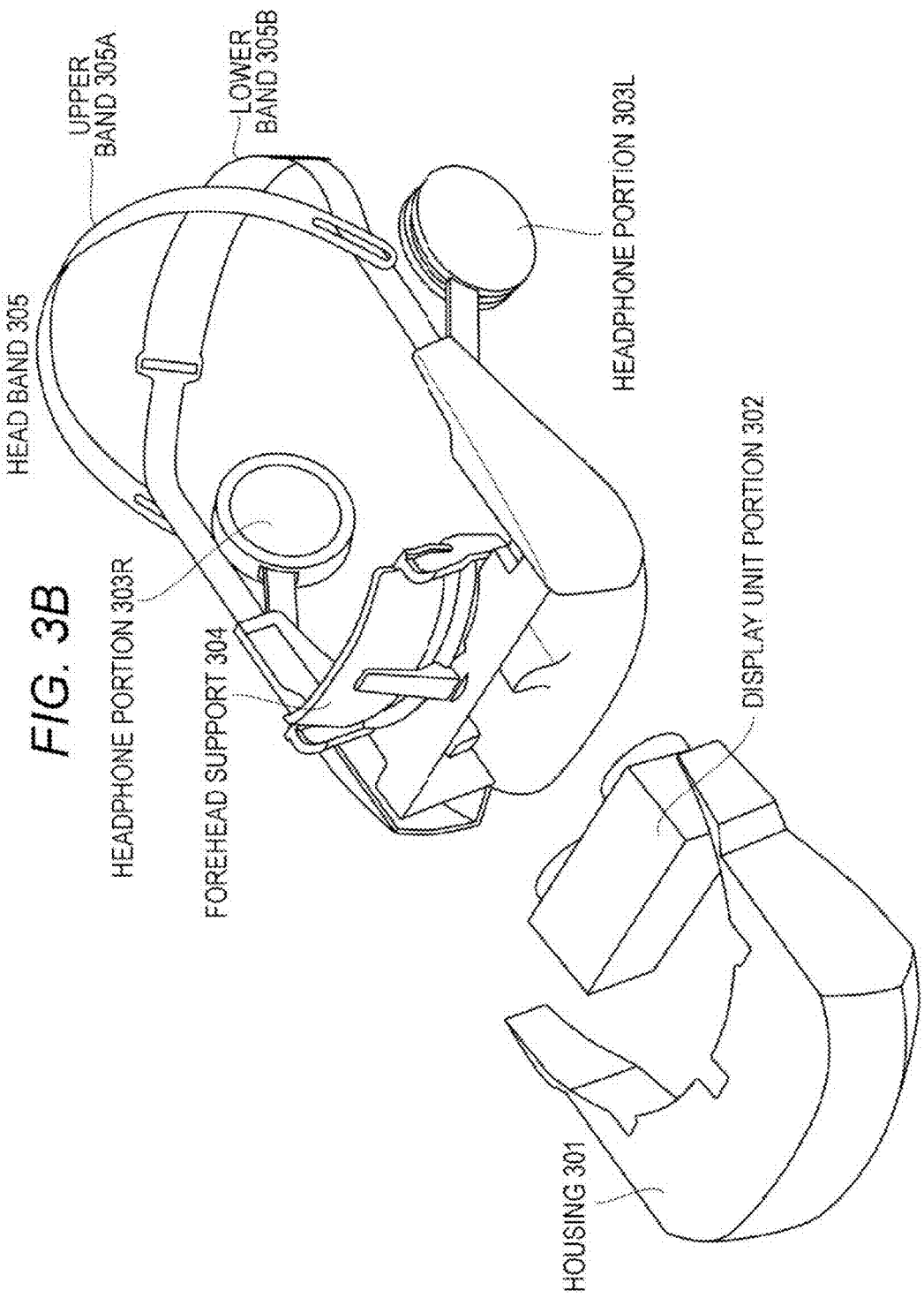
FIG. 3B is a diagram showing the head-mounted display 10 in an exploded state.

FIG. 3 shows an example configuration of an external appearance of the head-mounted display 10. Here, FIG. 3A is a perspective view seen at an angle from the front left side, and FIG. 3B is a diagram showing a roughly exploded state. As shown in FIG. 3B, the head-mounted display 10 is formed from a display unit portion 302 including most of the main parts shown in FIG. 2, including a display system, a housing 301 covering the display unit portion 302, a forehead support 304 protruding from the upper surface of the housing 301, a head band 305 including upper bands 305A and 305B, and headphone portions 303L and 303R accommodating left and right headphones 212L and 212R. The display units 208L and 208R, and a circuit board are accommodated inside the display unit portion 302.

When a user wears the head-mounted display 10 on the head, the forehead support 304 abuts the forehead of the user, and the head band 305 abuts the backside of the head. Although details are omitted from FIGS. 3A and 3B, the head band 305 is adjustable with respect to the length, and is made of a stretchable material, and the head-mounted display 10 is fixed to the head by the head band 305 strapped around the head.

Figure 4:
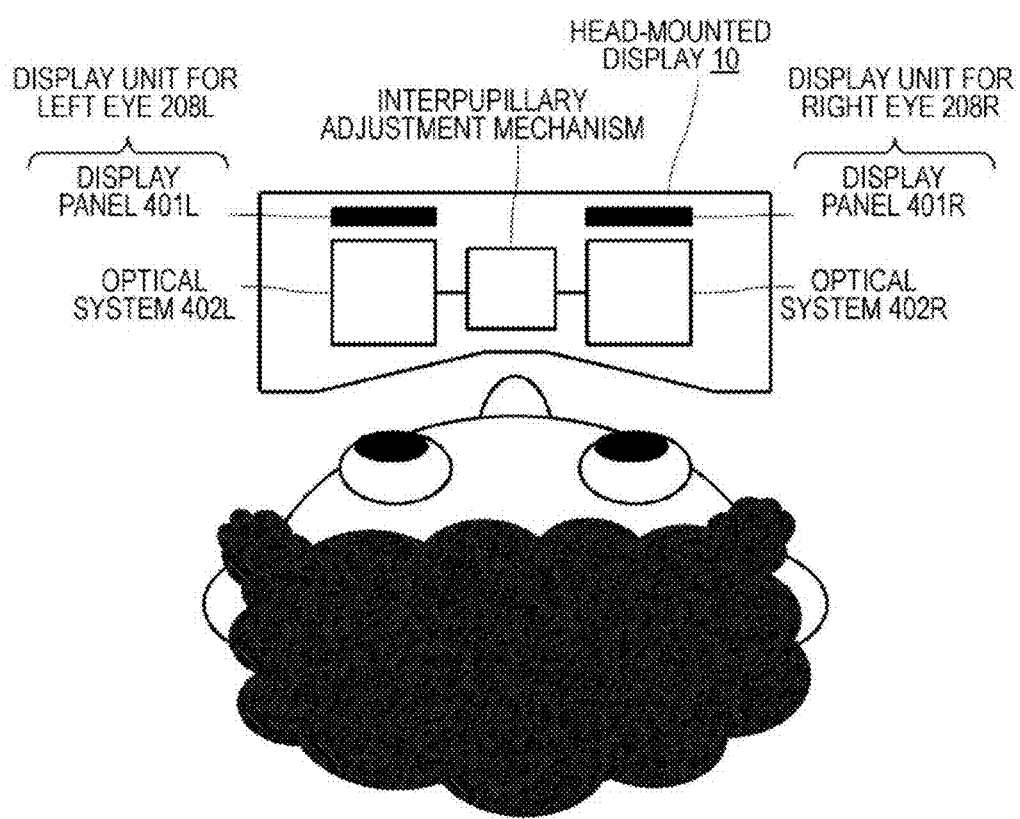
FIG. 4 is a diagram showing a top surface of a main body of the head-mounted display 10.

FIG. 4 shows a top surface, seen from above, of the display unit portion 302 of the head-mounted display 10. Each of the left and right display units 208L and 208R includes the display panel 401L or 401R formed from organic EL elements, and a gate driver and a data driver for driving the display panel (as described above). Also, optical systems 402L and 402R, each with a wide viewing angle, are arranged on the backside of the display units 208L and 208R (on the side of the eyes). Additionally, the height of the eye and the interpupillary distance are different for each user, and the wide viewing angle optical system and the eye of the user wearing the same have to be aligned. To this end, an interpupillary adjustment mechanism for adjusting the interpupillary distance is provided between the display unit for the right eye and the display unit for the left eye.

Figure 5:
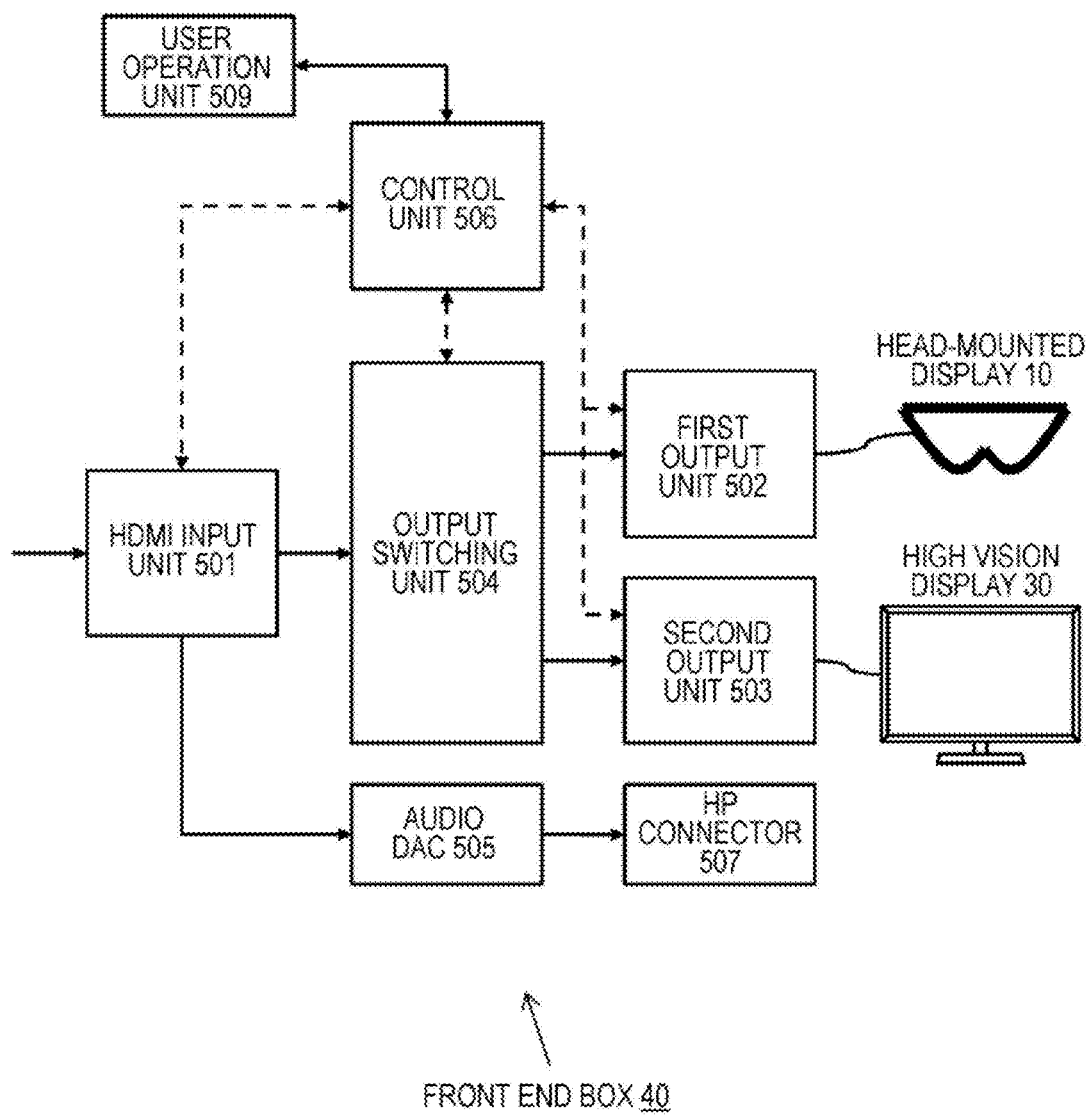
FIG. 5 is a diagram schematically showing an internal configuration of a front end box 40.

FIG. 5 schematically shows an internal configuration of the front end box 40.

An HDMI input unit 501 is compatible with an HDMI interface, and inputs, via an HDMI cable, an AV signal reproduced and output from the Blu-ray disc reproduction device 20 connected by an HDMI cable, and performs signal processing such as equalization processing.

Also, the head-mounted display 10 is connected to a first output unit 502, and the high vision display 30 is connected to a second output unit 503.

The second output unit 503 is compatible with an HDMI interface, and outputs AV signals to the high vision display 30 connected by an HDMI cable. Additionally, a configuration is also possible where the front end box 40 is equipped with a plurality of second output units 503, and outputs AV signals to two or more HDMI-compatible TVs.

In contrast, the first output unit 502 is compatible with proprietary interface specifications. Of course, the first output unit 502 may also be configured so as to be compatible with the HDMI interface. The first output unit 502 is connected to the head-mounted display 10 by one cable which is compatible with the proprietary interface specifications, and performs transmission of AV signals, transmission of various information signals, and supply of drive power via this cable.

A control unit 506 controls the operation of each unit inside the front end box 40 in an integrated manner.

The output switching unit 504 selectively switches the output destination of AV signals input to the HDMI input unit 501 to the first output unit 502 or the second output unit 503, that is, to the head-mounted display 10 or the high vision display 30. In the present embodiment, with the output switching unit 504, the output destination of AV signals is exclusive, and the highest priority is on the output to the head-mounted display 10. When the power of the head-mounted display 10 is on, or when a user is using the head-mounted display 10, the AV signals are output only to the head-mounted display 10. In other words, the AV signals are output to the high vision TV 30 with a low priority only when a user is not using the head-mounted display 10, such as when the power of the head-mounted display 10 is off, or when the head-mounted display 10 is not connected. Details of the operation of the output switching unit 504 will be given later.

The control unit 506 determines the use state of the head-mounted display 10 according to an information signal received at the first output unit 502 from the head-mounted display 10, the voltage level of a signal line supplying drive power to the head-mounted display 10, or the like, and issues an instruction to the output switching unit 504 regarding the output destination of the AV signals.

Furthermore, the main body of the front end box 40 is equipped with a user operation unit 509 including one or more operators that a user can operate with a finger or the like. A user may also issue an instruction about switching of the output destination of the AV signals by the user operation unit 509.

An audio DAC 505 analog-converts an audio signal separated by the HDMI input unit 501, and outputs the same from a headphone (HP) connector 507.

Figure 6:
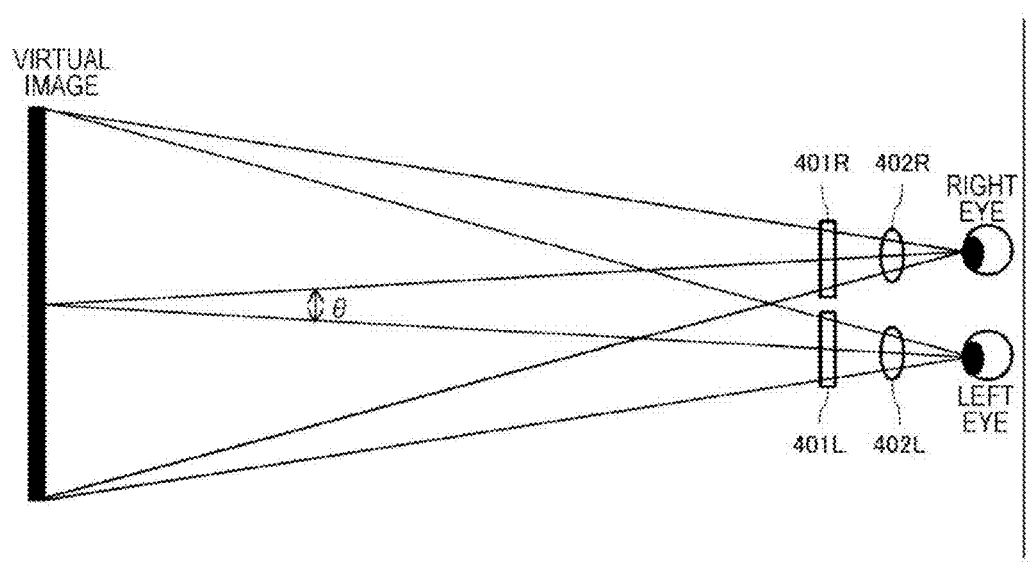
FIG. 6 is a diagram for describing a mechanism for projecting a virtual image by the head-mounted display 10.

Now, a mechanism of the head-mounted display 10 for projecting a virtual image will be described with reference to FIG. 6. Each piece of image information for the left eye and the right eye, which is a source of a stereoscopic image, is created assuming a predetermined angle of convergence (the angle of eye crossing). Then, the head-mounted display 10 projects these images for the left eye and the right eye on separate screens, and allows human eyes to combine the screens and to observe a stereoscopic image. Images projected by the left and right display panels 401L and 401R are virtual images magnified by the optical systems 402L and 402R. When these images are formed on the retinae of the left and right eyes, they enter the brain as separate pieces of information, and are overlapped with each other in the brain to form one stereoscopic image. At this time, a certain angle of convergence θ according to the positions of viewpoints is given between the left and right display panels 401L and 401R, and between the optical systems 402L and 402R. Then, the image for the left eye and the image for the right eye are created according to the angle of convergence θ that is set.

Next, the mechanism of reproducing an image such as to be viewed in a movie theater by using the head-mounted display 10 will be described.

Figure 7:
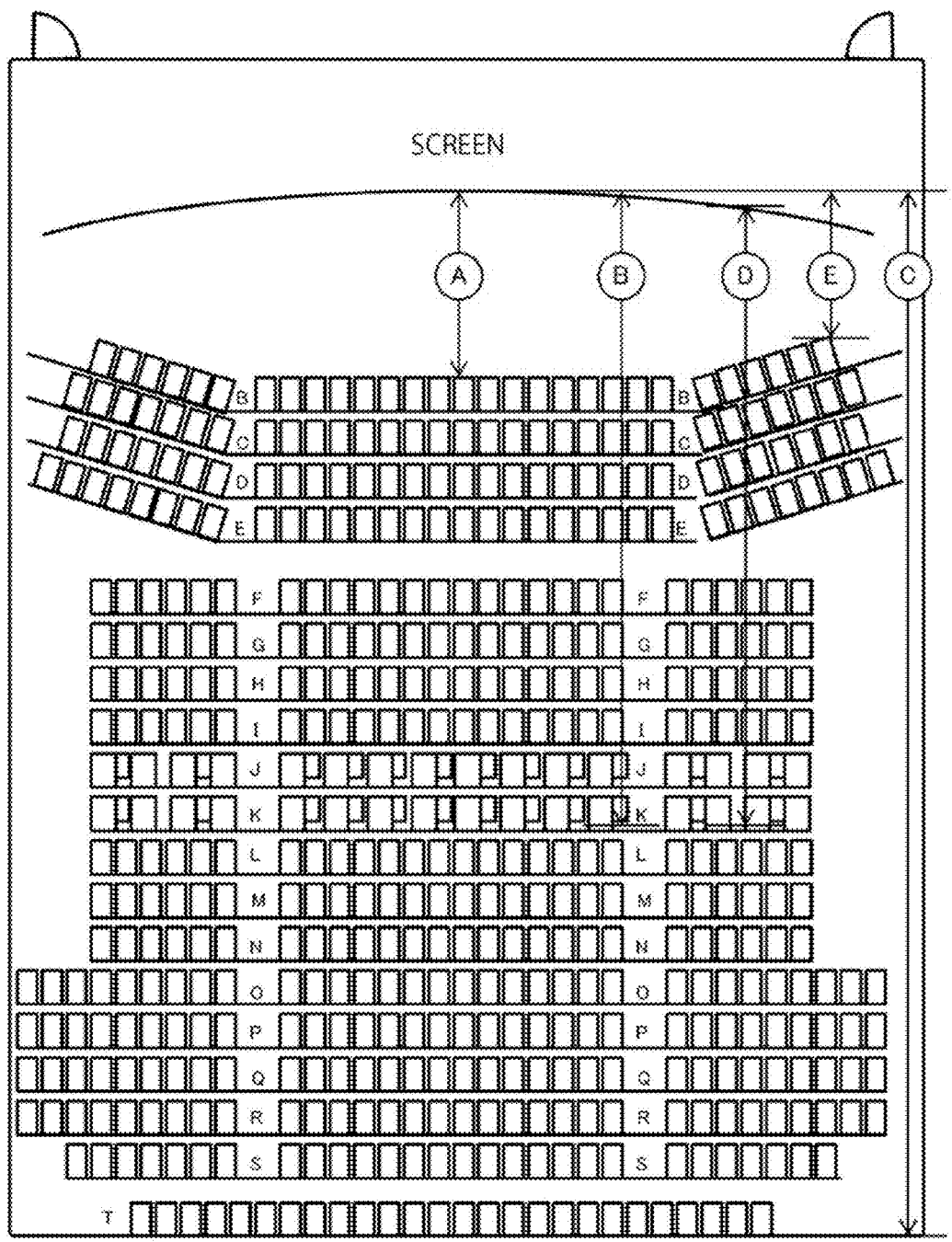
FIG. 7 is a diagram showing an example structure of an inside premise of a movie theater.

FIG. 7 shows an example structure of an inside premise of a movie theater. A total of 19 rows of seats, B to E, F to S, and T (the row at the end), are arranged in the inside premise shown. Among these, rows K and J are premium seats. In this drawing, the width of the screen is 16.5 meters, and when this is corrected to an aspect ratio of 16:9, the width will be 16.5 meters, the height will be 9.3 meters, and the image size will be 745.3 inches. Also, the distance from each seat to the screen is as shown in Table 1 below.

TABLE 1

| Location | Symbol | Distance [m] |
|---|---|---|
| Front row to screen center | A | 4.25 |
| Premium seat (rowK) to screen center | B | 17 |
| Row at the end to screen center | C | 26.5 |
| Foremost row to screen center | E | 2.53 |
| Premium seat (row K) to screen vertical direction | D | 16.5 |

Now, when the angle of view is calculated with respect to the position of seat in each of rows J, K, L, M, N, O, P, and T, it will be as shown in Table 2 below. Additionally, the angle of view is calculated using the position of the center of the screen.

TABLE 2

| Seat position | Distance [m] | Angle of view [deg] |
|---|---|---|
| J | 15.7 | 55.4 |
| K | 17.0 | 51.8 |

TABLE 2-continued

| Seat position | Distance [m] | Angle of view [deg] |
|---|---|---|
| L | 18.1 | 49.0 |
| M | 19.2 | 46.5 |
| N | 20.3 | 44.2 |
| O | 21.4 | 42.2 |
| P | 22.5 | 40.3 |
| T | 26.5 | 35 |

The angle of view is about 50 to 55 degrees for rows J and K, which are premium seats, and the angle of view is too wide. For example, one has to move his face to read a subtitle displayed near the edge of the screen, which may cause a stiff neck, and the image is hardly easy to view. The premium seats take into account the acoustic environment of the inside premise rather than merely the viewing of an image, and the angle of view itself with respect to the screen is not the best. Moreover, the present inventors assume that the angle of view that is suitable for viewing an image and that does not result in a stiff neck is narrower than 55 degrees, and about 45 degrees. As can be seen from Table 2 above, the angle of view of 45 degrees in the movie theater shown in FIG. 7 corresponds to around row N. When taking into account the distance from a seat position in row N to the center of the screen, reproduction by the head-mounted display 10 with the angle of view of 45 degrees in the movie theater corresponds to forming, on a retina, of a virtual image of about 750 inches at 20 meters away from the eye of a user, as shown in Table 3 below.

TABLE 3

| Image size [inch] | 750 |
|---|---|
| Width [m] | 16.6 |
| Distance [m] | 20.0 |
| Angle of view [deg] | 45.09 |

Figure 8:
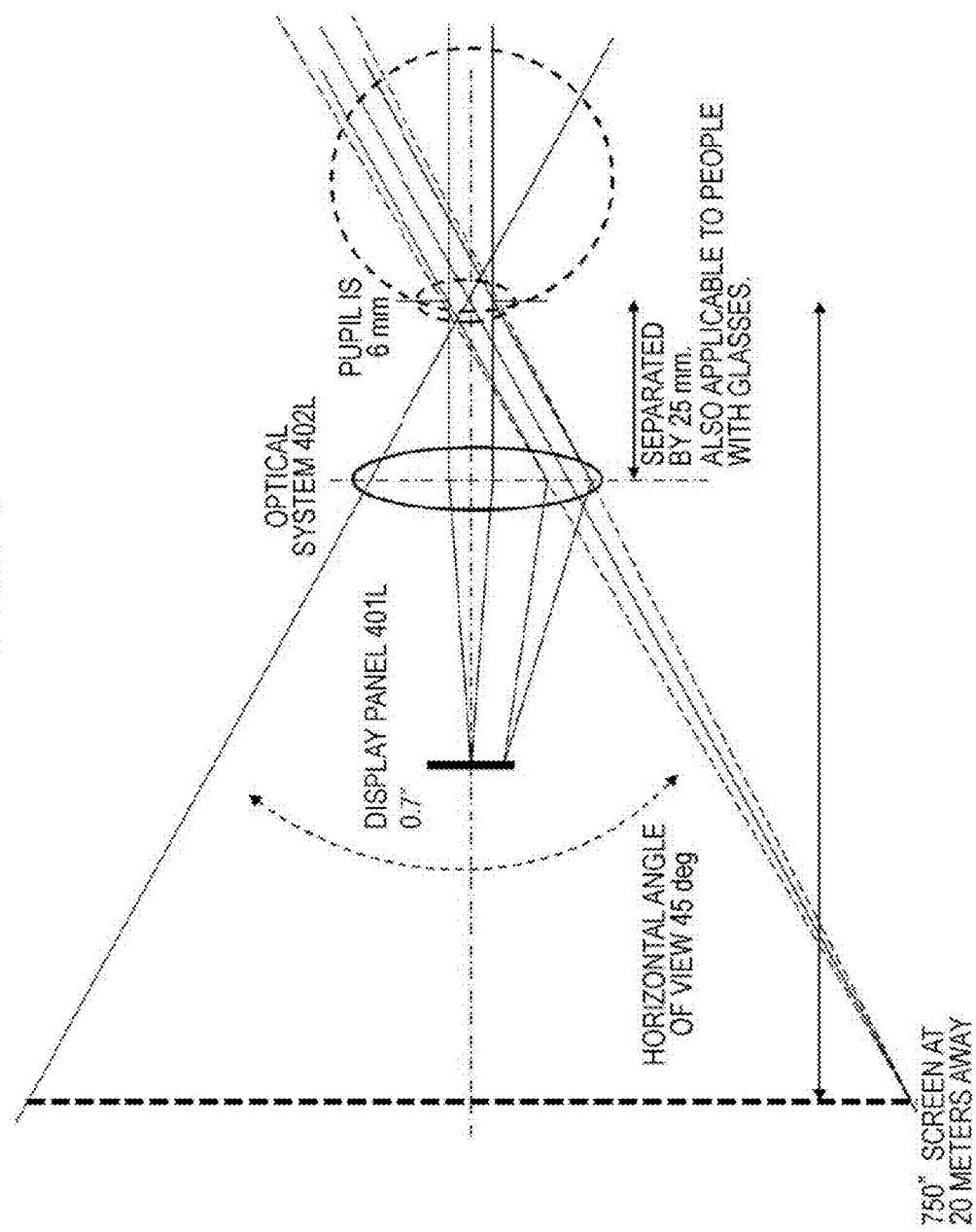
FIG. 8 is a diagram showing an example arrangement of an optical system 402L (402R) and a display panel 401R (401L) for forming on a retina a virtual image of about 750 inches at 20 meters away from an eye of a user.

When taking only the angle of view into account, if a virtual image, about 300 inches and several meters away, is formed on a retina, an approximately same angle of view of about 45 degrees is obtained. However, in the case of displaying a 3D image with a disparity between the left and right images, if the distance is made long with the same angle of view, there is a sense of depth on the farther side, and a more natural stereoscopic image is obtained. The distance may be made long with the same angle of view by using a wide viewing angle optical system as each of the left and right display units 208L and 208R. FIG. 8 shows an example arrangement of the optical system 402L (402R) and the display panel 401R (401L) for reproducing an angle of view of 45 degrees in a movie theater, that is, for forming on a retina a virtual image of about 750 inches at 20 meters away from an eye of a user.

B. Measures Against Deterioration of Display Panel

Use of organic EL elements for the left and right display units 208L and 208R to provide a high-resolution image has been mentioned above. The organic EL element is known to be susceptible to burn-in when display is performed over a long period time. When the burn-in occurs, the brightness of the organic EL element is reduced. Thus, when an image is displayed on a display panel formed from the organic EL elements, the brightness of a region where there is a deterioration will be lower than other regions, that is, the region will be darker, and a viewer will see the contour of the region where the burn-in has occurred.

For example, there is known orbital (ORBIT) processing for periodically displacing the entire image displayed on a display panel in vertical and horizontal directions at a slow speed unperceivable to a viewer. With the orbital processing, the contour of the burn-in is blurred and obscured.

Figure 9:
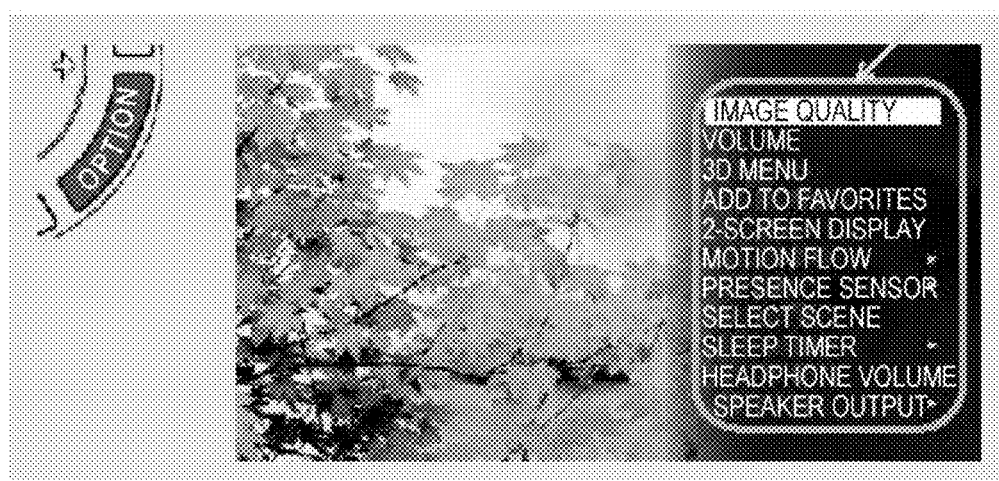
FIG. 9 is a diagram showing an example of a screen displaying a GUI.

The burn-in of a display panel is known to occur when a still image is displayed over a long period of time. The present inventors believe that an artificial image also tends to be a cause of the burn-in. This is because when displaying white text or the like, an image signal with a high degree of brightness, which is not of a natural image, is output. A typical example of an artificial image is OSD information, such as a GUI, which is superimposed on an original image signal by the signal processor 202. FIG. 9 shows an example of a display screen where a GUI is superimposed on a natural image.

Figure 10:
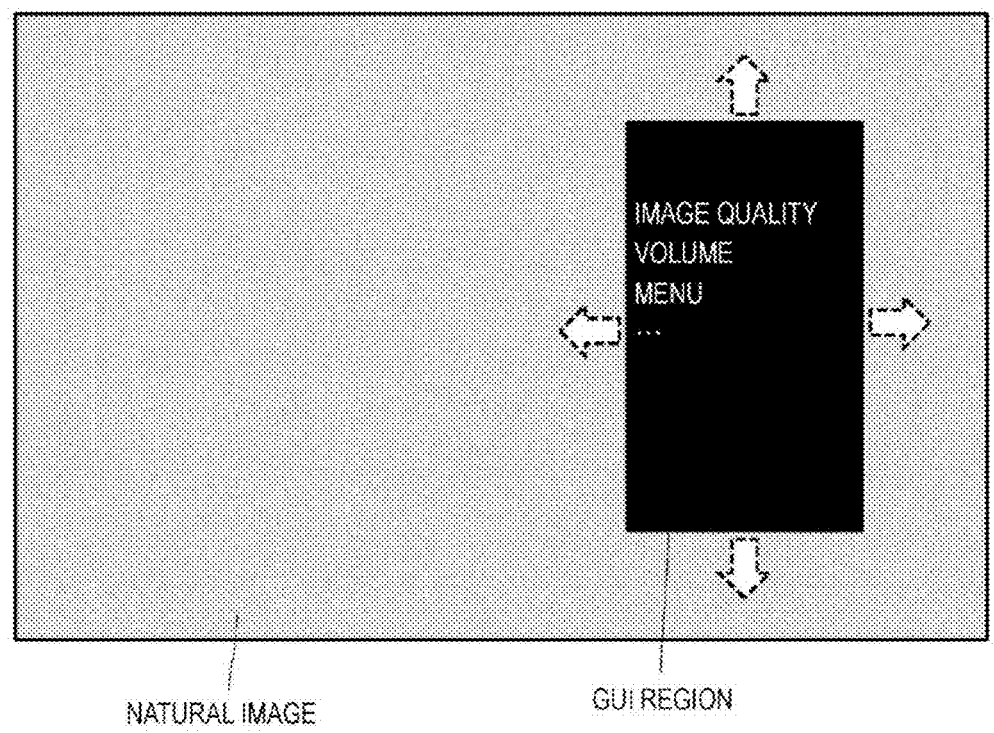
FIG. 10 is a diagram schematically showing application of orbital processing on a GUI region.

Accordingly, in the present embodiment, burn-in by GUI display is suppressed by applying an orbital operation on a GUI region. FIG. 10 schematically shows application of the orbital processing on a GUI region. Of course, the orbital operation for the GUI region may be performed together with the orbital operation on the entire screen described above.

For example, the GUI region is randomly moved by one pixel vertically or horizontally by one orbital operation. Also, the amount of vertical or horizontal movement is about ±15 pixels at the most so that the orbital operation is inconspicuous to an observing user.

The orbital operation may be started every time a GUI region is output, or the orbital operation may be performed at every specific interval. Also, while a GUI is being operated (while an operator of the user operation unit 220 is being operated), the orbital operation is not to be performed, because a user is paying attention to the GUI region and will easily notice the orbital operation.

The orbital processing described above is realized by the CPU 206 issuing an instruction for the orbital processing to be performed, at the time of instructing the signal processor 202 to OSD-display a GUI according to a user operation via the user operation unit 220, for example.

Figure 11A:
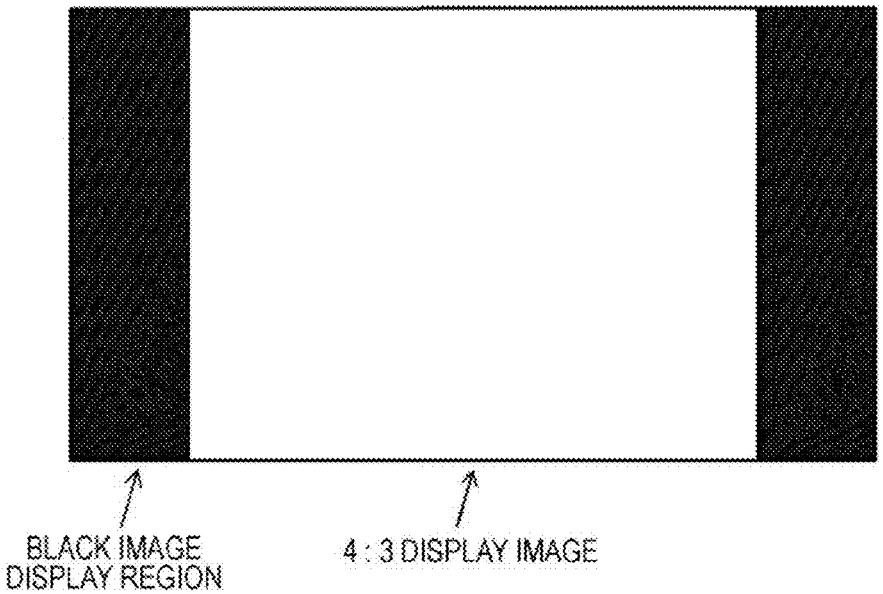
FIG. 11A is a diagram showing generation of a black image display region at a time of displaying an image signal with a different aspect ratio.
Figure 11B:
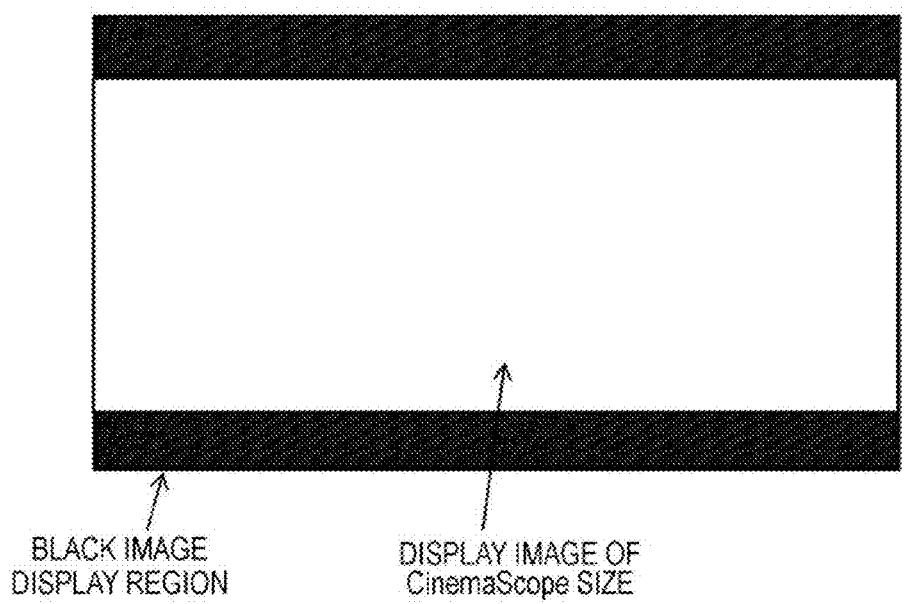
FIG. 11B is a diagram showing generation of a black image display region at a time of displaying an image signal with a different aspect ratio.

Also, when an image signal with a different aspect ratio is supplied, the problem of burn-in may arise due to generation of a black image display region. As described above, in the present embodiment, the aspect ratio of the display panel is 16:9, which corresponds to the standard screen size of HDTV, but in the case of displaying an image signal with an aspect ratio of 4:3 according to NTSC (National Television System Committee) method, a black image display region is generated on the left and right of the display panel, as shown in FIG. 11A. On the other hand, in the case of displaying a horizontally-long image signal with an aspect ratio of 2:1 or more, such as CinemaScope (registered trademark), a black image display region is generated at the top and bottom of the display panel, as shown in FIG. 11B. If such an image signal with a different aspect ratio is displayed over a long period of time, the deterioration in the brightness of the organic EL element does not progress in the black image display region, but the deterioration in the brightness of the organic EL element does progress in an image display region. If an image signal with the same aspect ratio is displayed afterward, the boundary with the black image display region which was generated at the time of image display shown in FIG. 11A or FIG. 11B will be conspicuous.

Accordingly, in the present embodiment, a parameter for burn-in correction for each region of a display panel is determined according to the aspect ratio of an image to be displayed, and the contour of burn-in at the time of displaying an image signal with the same aspect ratio is blurred and made inconspicuous.

The aspect ratio may be acquired based on title information of content to be reproduced by the Blu-ray disc reproduction device 20, for example. Additionally, the means for acquiring the title information of content at the head-mounted display 10 side is not particularly specified, and also, the aspect ratio may be determined based on information other than the title information.

When the aspect ratio is determined, black image display time is measured for each pixel or region of the display panel based on the time of outputting an image signal. The brightness of the organic EL element deteriorates more greatly as the black image display time is shorter. Accordingly, a brightness correction parameter for each pixel or region of the display panel may be determined based on the measurement result of the black image display time.

For example, after determining the aspect ratio based on the title information or the like of content of an image signal supplied via the front end box 40, the CPU 206 measures the black image display time of each pixel or region of the display panel, determines a brightness deterioration correction parameter for each pixel or region of the display panel based on the measurement result, and notifies the signal processor 202 of the same. Then, the signal processor 202 performs image quality enhancement process such as brightness level correction for each pixel or region of the display panel based on the brightness deterioration correction parameter which has been input.

C. Reduction of Radiation Noise of Display Panel

Although simplified in FIG. 2, in between the panel controller 204 and the left and right display units 208L and 208R are bundles of a plurality of display data signal lines that operate at a high frequency. When signals that are output in parallel in this manner operate in synchronization, unnecessary radiation is increased, and also, a simultaneous switching noise of a power source is increased.

Accordingly, in the present embodiment, display data signals to be output in parallel from the panel controller 204 to the left and right display units 208L and 208R are made different for the left and right with respect to the phase, the frequency or the polarity.

Figure 12A:
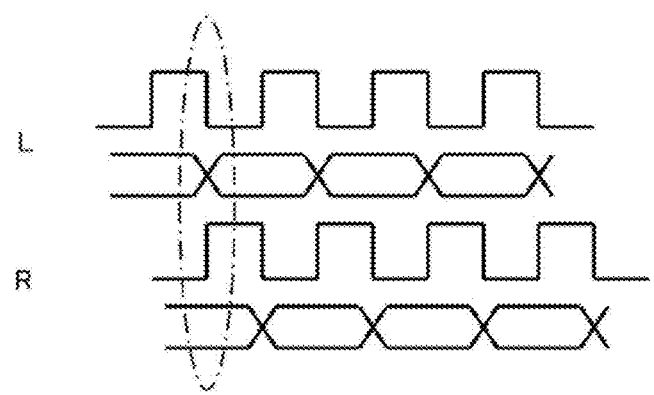
FIG. 12A is a diagram showing an example where phases of display data signals output in parallel to left and right display units 208L and 208R are shifted by 180 degrees between the left and right.
Figure 12B:
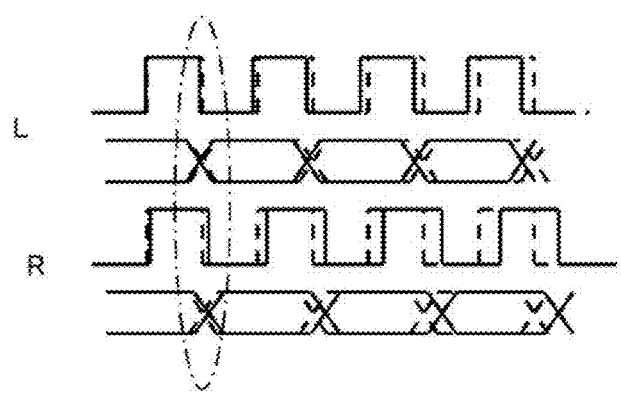
FIG. 12B is a diagram showing an example where frequencies of display data signals output in parallel to the left and right display units 208L and 208R are shifted between the left and right.
Figure 12C:
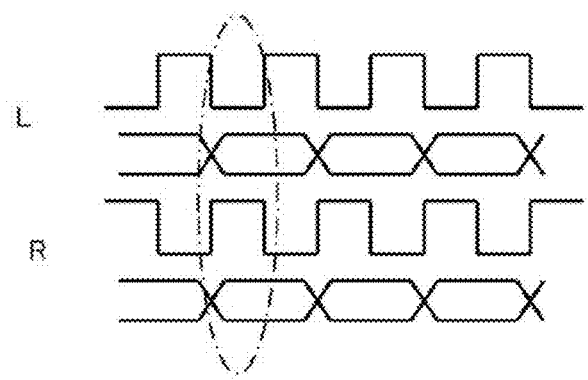
FIG. 12C is a diagram showing an example where polarities of display data signals output in parallel to the left and right display units 208L and 208R are shifted between the left and right.

FIG. 12A is a diagram showing an example where phases of display data signals output in parallel to the left and right display units 208L and 208R are shifted by 180 degrees between the left and right. Also, FIG. 12B is a diagram showing an example where frequencies of display data signals output in parallel to the left and right display units 208L and 208R are shifted between the left and right. Moreover, FIG. 12C is a diagram showing an example where polarities of display data signals output in parallel to the left and right display units 208L and 208R are shifted between the left and right. As can be seen by referring to the part surrounded by a dashed line in each of the drawings, the number of simultaneous switchings or the polarity is changed between the left and right, and thus, the radiation noise is reduced. Moreover, with the simultaneous switching noise of a power source being reduced, the load on the power source is also reduced.

In the case of the head-mounted display 10, since there is a correlation between the left and right image signals, the effect of shifting the phase, the frequency or the polarity as described above is considered to be significant.

D. Coping with Dark Adaptation

The eyes of a human are known to have a "dark adaptation" function by which, when a drastic change from an environment with a great amount of visible light to an environment with a small amount thereof takes place, eyesight gradually recovers over time. The head-mounted display 10 is designed to completely shut out the outside world when mounted on the head so as to increase the sense of virtual reality at the time of viewing. The environment includes a great amount of visible light immediately before the head-mounted display 10 is mounted, and the pupil diameter is adapted to the environment. When the head-mounted display 10 is mounted, the environment changes to that where the light is blocked and the amount of visible light is significantly small, and the pupil diameter gradually adapts to the mounted state over the course of 10 to 30 minutes.

For example, in the case the brightness level of images output from the display panels 401L and 401R (the viewing peak brightness) is constant at all times, the eyes of a user cannot, immediately after the mounting of the head-mounted display 10, adapt to the environment where the light is blocked, and the environment may be felt as being too dark, but thereafter, the eyes gradually adapt to the dark and the environment may be felt as being sufficiently bright. In other words, there is an inconvenience that an image may be felt as being too dark immediately after the mounting.

Accordingly, in the present embodiment, the viewing peak brightness is changed according to the elapsed time from the mounting of the head-mounted display 10 on a user so as to make the user feel that the brightness of a display image is constant, thereby overcoming the inconvenience described above.

Figure 13A:
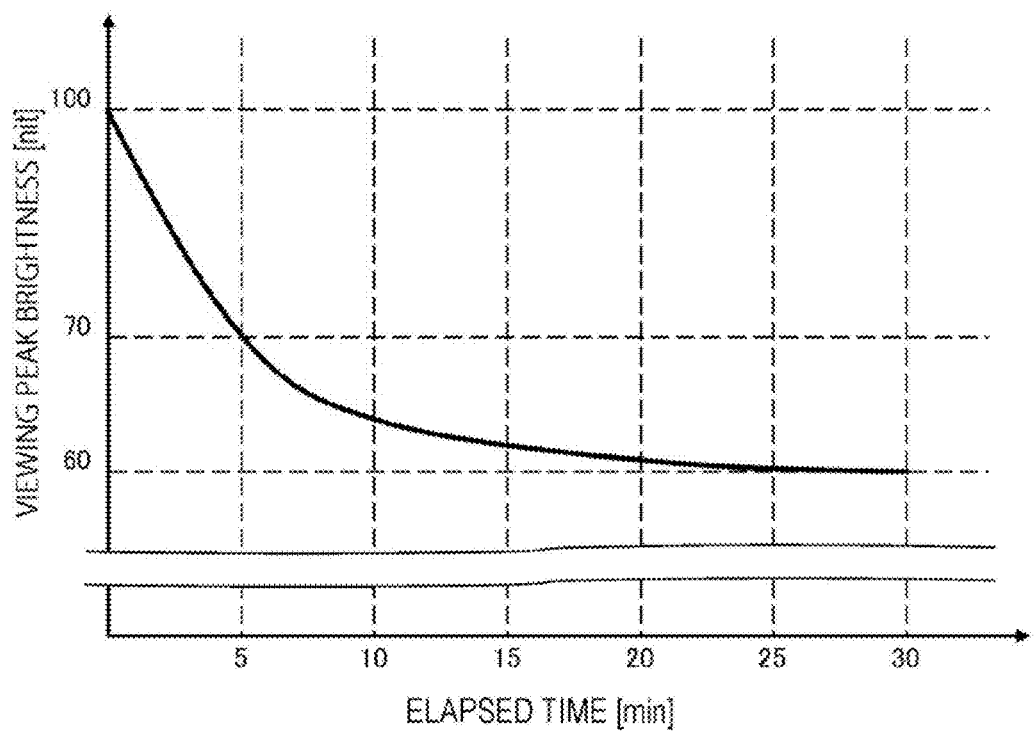
FIG. 13A is a diagram showing an example characteristic for changing viewing peak brightness to be output from the head-mounted display 10 according to dark adaptation of a person.

The present embodiment intends to reproduce, by the head-mounted display 10, an image such as viewed in a movie theater. Digital Cinema Initiative, LLC specifies viewing peak brightness of 48 nit (here, if the luminance of a planar light source of one square meter is one candela in a direction perpendicular to the plane, "nit" is the brightness in that direction). Due to the difference from a virtual environment where the outside world is blocked by the head-mounted display 10, the present inventors assume that peak brightness of 60 nit of the display panels 401L and 401R of the head-mounted display 10 corresponds to 48 nit in a movie theater. Viewing peak brightness for dark adaptation of 100 nit, which is higher than normal, is set for immediately after the mounting of the head-mounted display 10, and then normal viewing peak brightness of 60 nit is reached over the course of 10 to 30 minutes. FIG. 13A shows an example characteristic for changing viewing peak brightness to be output from the head-mounted display 10 according to dark adaptation of a person.

Furthermore, the speed of dark adaptation is different for each person. For a user who quickly adapts to dark, if the viewing peak brightness is slowly returned to 60 nit, the image may be felt as being too bright during the process. On the other hand, for a user who slowly adapts to dark, if the viewing peak brightness is returned to 60 nit at a high pace, the image may be felt as being too dark during the process.

Figure 13B:
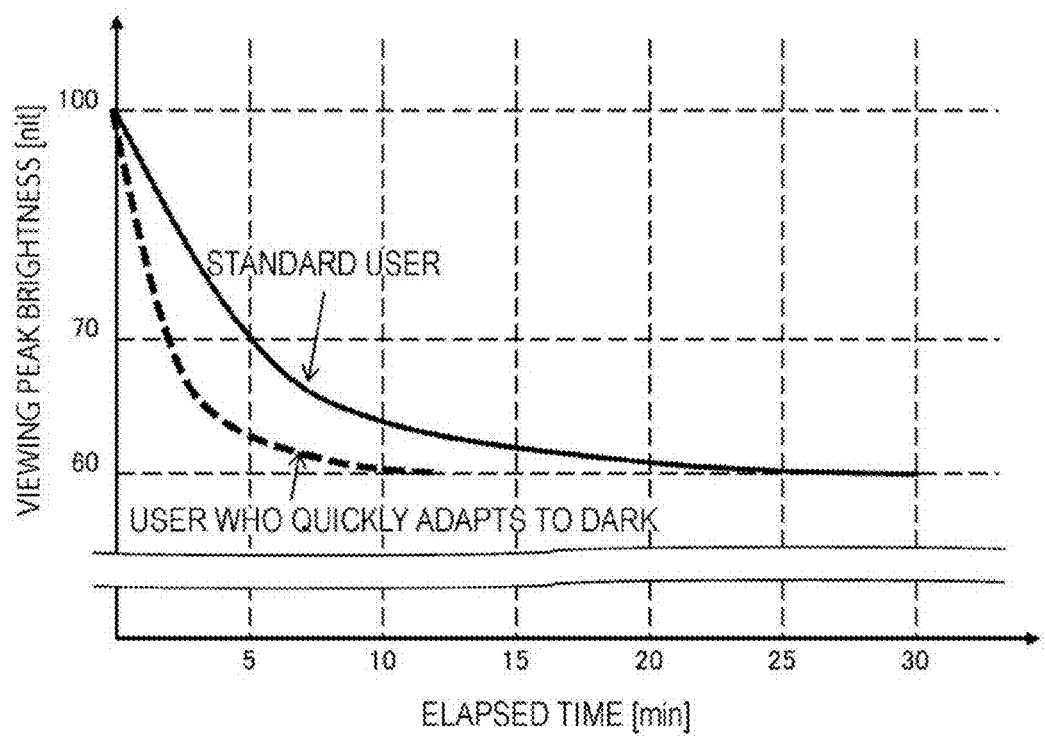
FIG. 13B is a diagram showing several example characteristics for changing viewing peak brightness to be output from the head-mounted display 10 according to individual variation in dark adaptation.

Accordingly, as shown in FIG. 13B, a plurality of characteristics with different time over which the viewing peak brightness is lowered from the viewing peak brightness for dark adaptation, 100 nit, to the normal viewing peak brightness, 60 nit, may be prepared, and the brightness may be adjusted while switching the dark adaptation characteristic for each user. A user may be enabled to issue an instruction for the switching via the user operation unit 220. The CPU 206 may instruct the signal processor 202 to perform a corresponding brightness correction process upon receiving the instruction via the user operation unit 220.

Moreover, the degree to which a user who has just worn the head-mounted display 10 feels that a display image is dark is not constant, and is different according to the amount of light received in the outside world before the mounting. The greater the amount of visible light in the outside world, the smaller the pupil diameter, and thus, the darker the display image immediately after the mounting. On the other hand, if the amount of visible light in the outside world is small in the first place, the pupil diameter is large to the extent of the darkness, and the darkness is not greatly felt. In other words, if the viewing peak brightness immediately after the mounting is set to be constant regardless of the amount of visible light in the outside world, the brightness of a display image immediately after the mounting may be appropriate for a user who has worn the display in an environment with a great amount of visible light, but the display image immediately after the mounting may be too bright for a user who has worn the display in an environment with a small amount of visible light.

Figure 13C:
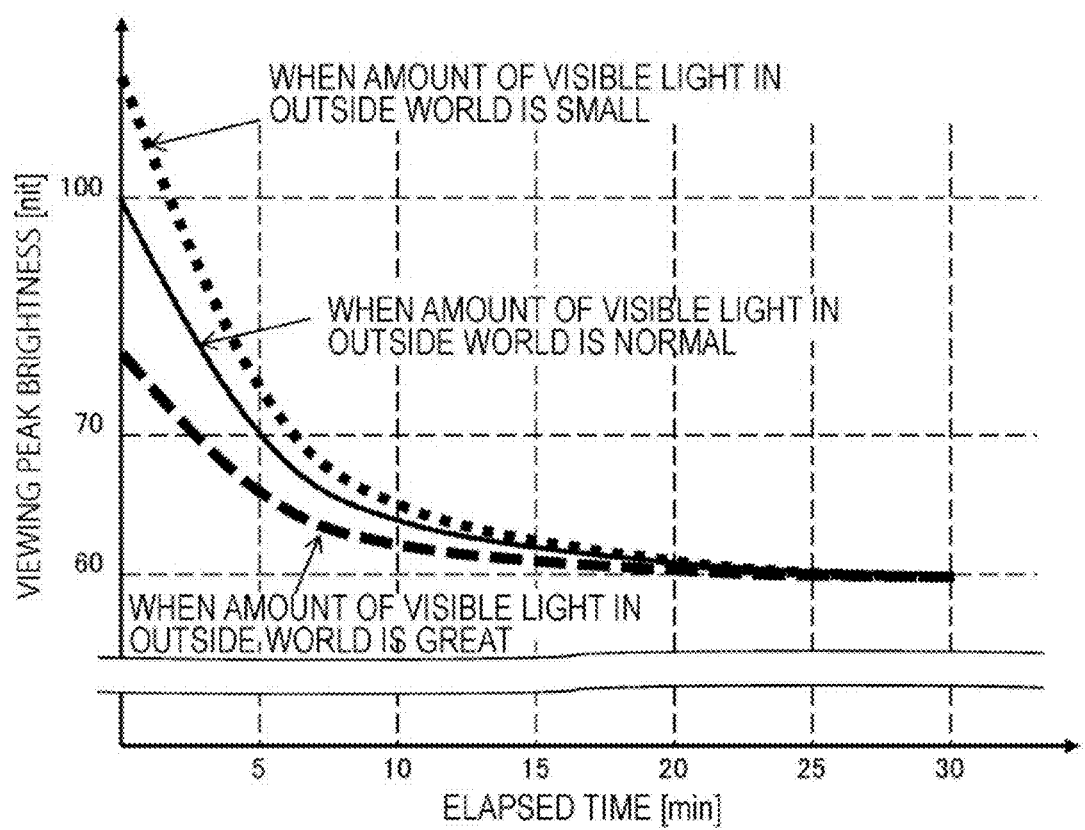
FIG. 13C is a diagram showing an example characteristic where the level of viewing peak brightness immediately after the head-mounted display 10 is mounted is adjusted according to the amount of visible light in the outside world.

Thus, as shown in FIG. 13C, the level of the viewing peak brightness for dark adaption that is to be set for immediately after the mounting of the head-mounted display 10 may be adjusted according to the amount of visible light in the outside world. If the amount of visible light in the outside world is great, high viewing peak brightness may be set, and if the amount of visible light in the outside world is small, lower viewing peak brightness may be set. As shown in FIG. 2, in the present embodiment, the head-mounted display 10 includes the brightness sensor 223. The CPU 206 may notify the signal processor 202 of the viewing peak brightness for dark adaption at the time of reducing the viewing peak brightness according to dark adaptation based on the amount of visible light in the outside world detected by the brightness sensor 223.

Additionally, to perform adjustment of the viewing peak brightness that copes with dark adaption as described above, the signal processor 202 has to be notified of the time of start, that is, the mounting of the head-mounted display 10 on a user. For example, a user himself/herself may instruct the start of viewing peak brightness adjustment at the time of mounting via the user operation unit 220. As shown in FIG. 2, in the present embodiment, the head-mounted display 10 is equipped with the mounting sensor 221, and thus, the CPU 206 may instruct the signal processor 202 to adjust the viewing peak brightness when mounting is detected by the mounting sensor 221.

Figure 14:
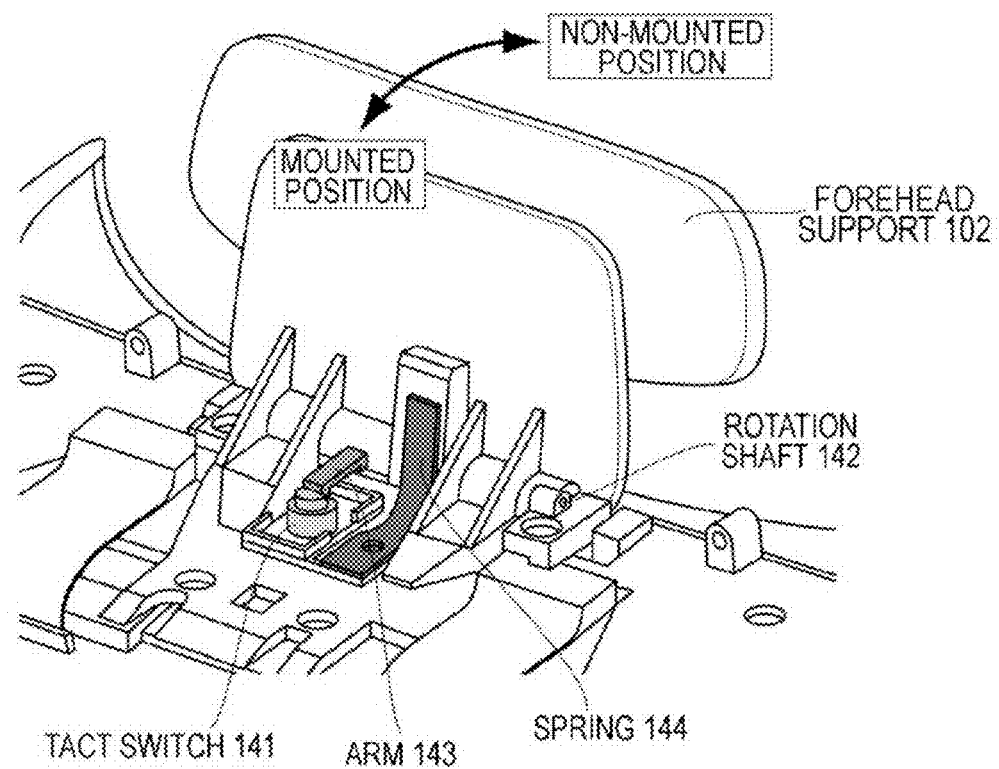
FIG. 14 is a diagram showing an example configuration of a mounting sensor 221.

FIG. 14 shows an example configuration of the mounting sensor 221. In the example shown, a forehead support 102 is supported on a housing of the head-mounted display 10 by a rotation shaft 142 in a freely rotatable manner. When not mounted, the forehead support 102 is pushed to the back of the head-mounted display 10, that is, toward the forehead side of a wearing user, to a non-mounted position, by a restoring force of a spring 144. Then, when mounted, it is pushed back to a mounted position in the front by being abutted against the forehead of the user. Furthermore, an arm 143 protruding to the front is attached to the rotation shaft 142. Then, when the forehead support 102 is pushed back to the front by being mounted on the user, the arm 143 moves in conjunction, and operates a tact switch 141 (corresponding to the mounting sensor) by its tip end portion. The CPU 206 may detect mounting of the head-mounted display 10 on the user based on the operation of the tact switch 141.

E. Recognition Support for Virtual Image Distance

As has been described in the section "A. System Configuration", with the head-mounted display 10, the optical systems 402L and 402R of the display units 208L and 208R are designed such that the seeming distance to the screens on the display panels 401L and 401R and the seeming size thereof are about the same as in a movie theater (for example, about 750 inches at a position 20 meters away). It is thus sought to enable a user wearing the head-mounted display 10 to view an image as if the user is in a movie theater.

However, the head-mounted display 10 is a device to be mounted on the head of a user, and an effect similar to mechanical myopia is possible caused. Moreover, there are the actual size of the head-mounted display 10 itself and the preconceived notion that the display panels 401L and 402R are inside the head-mounted display 10, and also, parts other than the screen are black at the time of mounting and there is no visual information indicating the distance to the image. Perception of a visual distance is different for each person, but there are cases where a user feels the distance to a virtual image to be shorter than designed, and cannot feel like he/she is seeing a large screen as in a movie theater.

Thus, in the present embodiment, images including visual information serving as a clue for a visual distance are displayed on the display panels 401L and 402R. An image including visual information serving as a clue for a visual distance may be a stereoscopic image of a state where a screen is being seen from the position of a seat in a movie theater before the showing (see FIG. 15A), or a stereoscopic image (a still image or a moving image) of the stage of a concert hall (see FIG. 15B), for example. The image, in an image display region of the display panel 401L or 402R, outside the screen of a movie theater or the stage of a concert hall corresponds to the visual information serving as a clue for a viewing user to grasp the visual distance.

Figure 15A:
FIG. 15A is a diagram showing an example display of a splash screen serving as a clue for a visual distance.
Figure 15B:
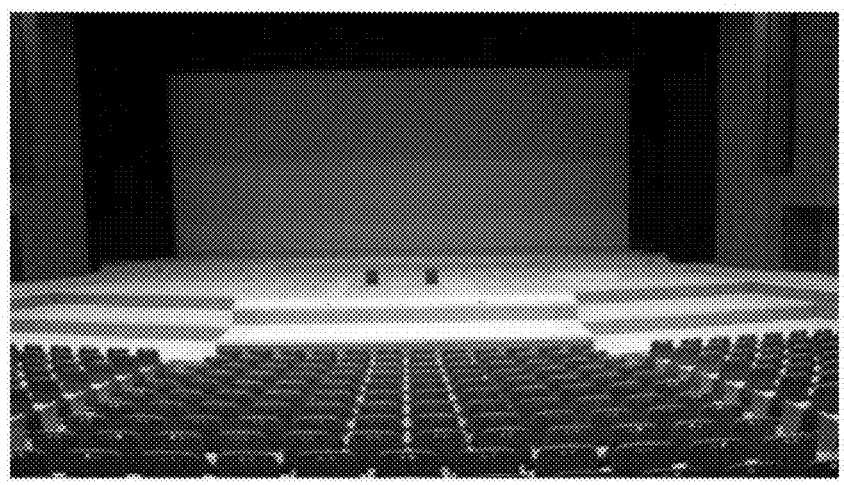
FIG. 15B is a diagram showing an example display of a splash screen serving as a clue for a visual distance.

If a stereoscopic image, as shown in FIG. 15A or FIG. 15B, perceived to have an actual size at the actual position on the screen or the stage is displayed as a so-called splash screen at the time of the power of the head-mounted display 10 being turned on or at the time of the head-mounted display 10 being mounted on a user, for example, when the screen or the stage is later expanded over the entire screens of the display panels 401L and 402R, the user will maintain the sense of distance to the screen or the stage that is shown (i.e. the impression of the visual distance intended at the time of design). Additionally, mounting of the head-mounted display 10 on a user may be detected by the mounting sensor 220 (as described above).

Figure 16:
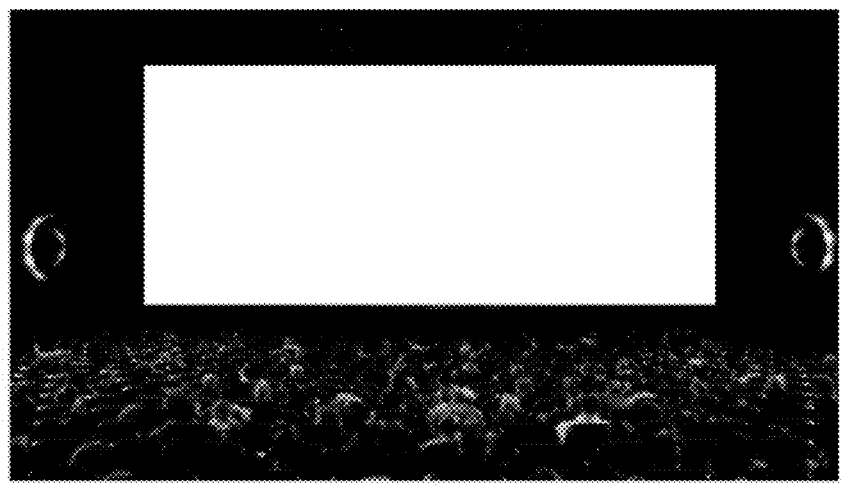
FIG. 16 is a diagram showing an example configuration of an image display area where, at the time of viewing of an image, an original image is displayed being reduced relative to the screen size, and an image (a stereoscopic still image) serving as a clue for a visual distance is displayed on the outer side.

Alternatively, as shown in FIG. 16, at the time of viewing of an image, an original image of a movie, a concert or the like may be displayed being reduced relative to the screen size of the display panels 401L and 402R (an original image may be displayed in an outlined region in the center in the drawing), and an image (a stereoscopic still image) seemingly of an actual size may be displayed in the peripheral region. The stereoscopic image seemingly of an actual size, which is displayed outside the image display regions of the display panels 401L and 402R, is the visual information serving as a clue for grasping the visual distance, and a user who views an original image may recognize the size of the screen or the stage and the distance.

F. Screen Display Following Movement of User's Neck

A user wears the head-mounted display 10 on the head and views an image, and thus, unlike a case of viewing a usual monitor display, an image is constantly in the field of view even if the user turns the neck to a side to look away from the screen. Therefore, the user may get an uncomfortable feeling or may feel sick when viewing using the head-mounted display 10.

In the present embodiment, the head-mounted display 10 is equipped with the accelerometer 22, and the movement of the head of the user wearing the head-mounted display 10 may be tracked based on the output of the sensor.

Figure 17:
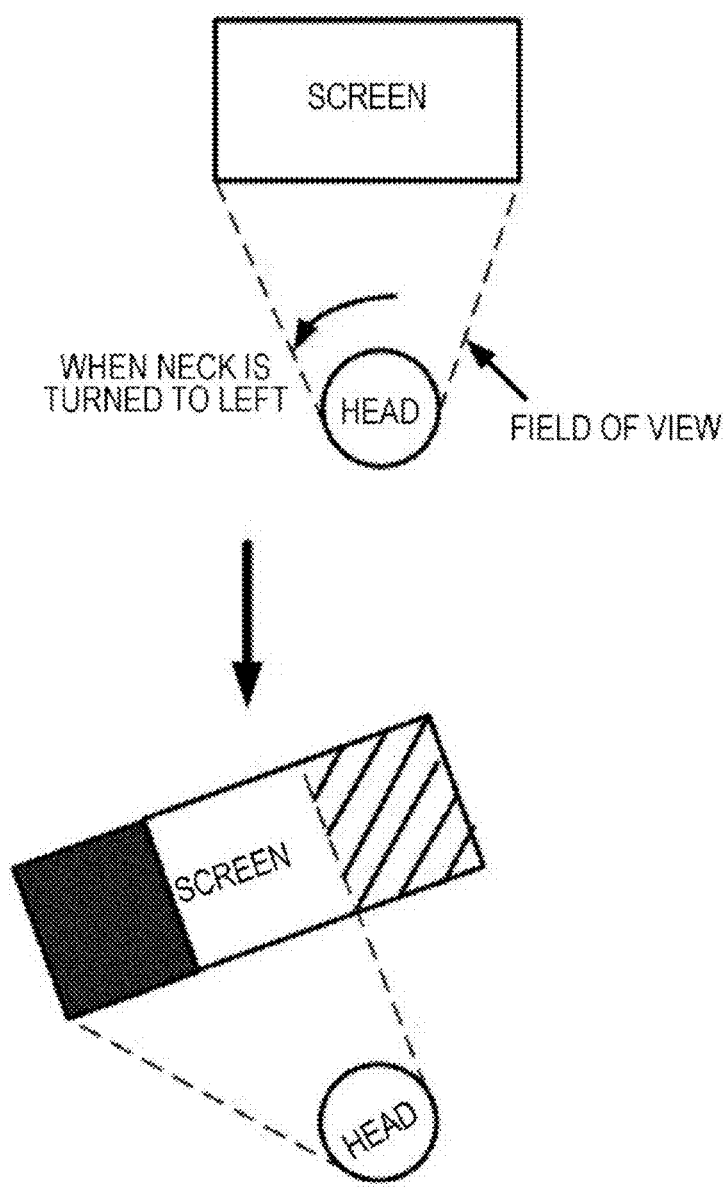
FIG. 17 is a diagram showing movement of display images of display panels 401L and 401R based on a result of tracking movement of the head of a user.

Thus, as shown in FIG. 17, the image display images of the display panels 401L and 401R may be moved based on the result of tracking the movement of the head of the user. At this time, of the display image, the end region opposite to the movement of the head (the region shown with diagonal lines in FIG. 17) drops behind the image display regions of the display panels 401L and 401R and becomes hidden. Accordingly, a user may avoid an image which may make him/her feel sick by turning his/her neck to a side. Also, of the image display regions of the display panels 401L and 401R, the end region in the movement direction of the head moves past the image frame and thus there is no image information, and a black image is displayed at a part outside the image frame. In this manner, when a user turns his/her neck to a side, he/she may view an image in the same way he/she views the image with a normal monitor display, and the sense of discomfort may be overcome.

The CPU 206 is capable of calculating the amount of movement of a user's head (the amount of rotation of the neck) by acquiring sensor information from the accelerometer 222. Accordingly, with the CPU 206 instructing the signal processor 202 to move the image to be displayed in accordance with the calculated amount of motion, image display as shown in FIG. 17 may be realized.

Also, as described above, due to the preconceived notion that the display panels 401L and 402R are inside the head-mounted display 10, for example, a user may feel the visual distance to be shorter than the designed distance to a virtual image. Accordingly, if the amount of motion of an image is determined based on the designed distance to a virtual image at the time of moving an image to be displayed in accordance with the amount of motion of the head of a user, an impression of the visual distance intended at the time of design may be given to the user.

Figure 18A:
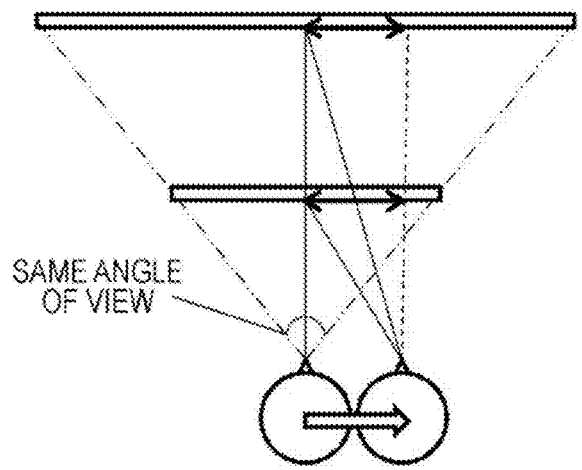
FIG. 18A is a diagram showing an example where the size of a virtual image is different according to an assumed visual distance even with the same angle of view.
Figure 18B:
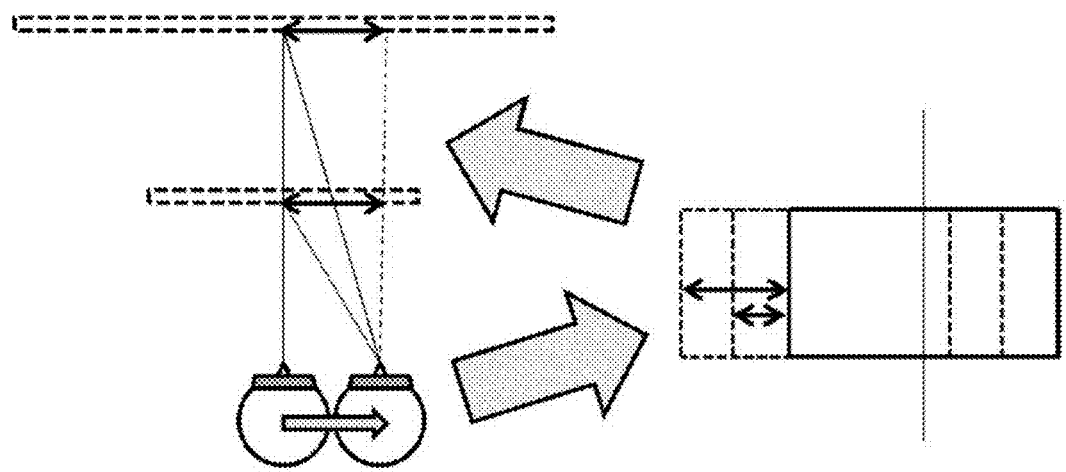
FIG. 18B is a diagram showing an example where a visual shift is different according to a visual distance.

As shown in FIG. 18A, even with the same angle of view, the size of a virtual image is different according to the assumed visual distance. A visual shift with respect to the screen at the time of movement of the position of the head becomes smaller in inverse proportion to the visual distance. If the visual distance doubles as shown in FIG. 18A, the visual shift is reduced to half as shown in FIG. 18B. That is, the number of pixels for movement will be half at the time of moving a display image as shown in FIG. 17.

At the time of moving an image to be displayed in accordance with the amount of motion of the head of a user in the manner described above, when a shift in the position of the head is detected based on acceleration information acquired from the accelerometer 222, the CPU 206 determines the amount of movement of the display position based on the designed visual distance to thereby give an illusion to the user with respect to the visual distance to the position of a virtual image.

G. Output Switching by Front End Box (1)

The front end box 40 corresponds to an HDMI repeater for inputting/outputting AV signals output from the Blu-ray disc reproduction device 20. Also, the front end box 40 is a two-output switcher according to which the output destination is exclusive, and output is performed to the head-mounted display 10 or the high vision display 30.

If the front end box 40 is the main appliance existing at the "front end" of the head-mounted display 10, the highest priority should be placed on the output to the head-mounted display 10.

Here, a case of performing output switching of the front end box 40 by a user operation will be considered. For example, if one wants to stop viewing with the head-mounted display 10 and to start viewing with the high vision display 30, at least the following two user operations have to be performed, and this may be burdensome.

(1) Operate the power switch 231, and turn off the power of the head-mounted display 10.

(2) Operate the user operation unit 509, and switch the output destination of the front end box 40 to the high vision display 30.

In the present embodiment, using the fact that the output destination of AV signals from the output switching unit 504 is exclusive, switching of a viewing operation from the head-mounted display 10 to the high vision display 30 is performed with a smaller number of user operations.

Specifically, when the power switch 231 is operated and the power of the head-mounted display 10 is turned off, this is detected by the control unit 506 via the first output unit 502, and the output switching unit 504 is instructed to switch the output destination of AV signals to the high vision display 30. That is, with the power state of the head-mounted display 10 and the output switching by the output switching unit 504 being in conjunction with each other, automatic switching to viewing with the high vision TV 30 may be performed by one user operation of turning off the power of the head-mounted display 10.

Figure 19A:
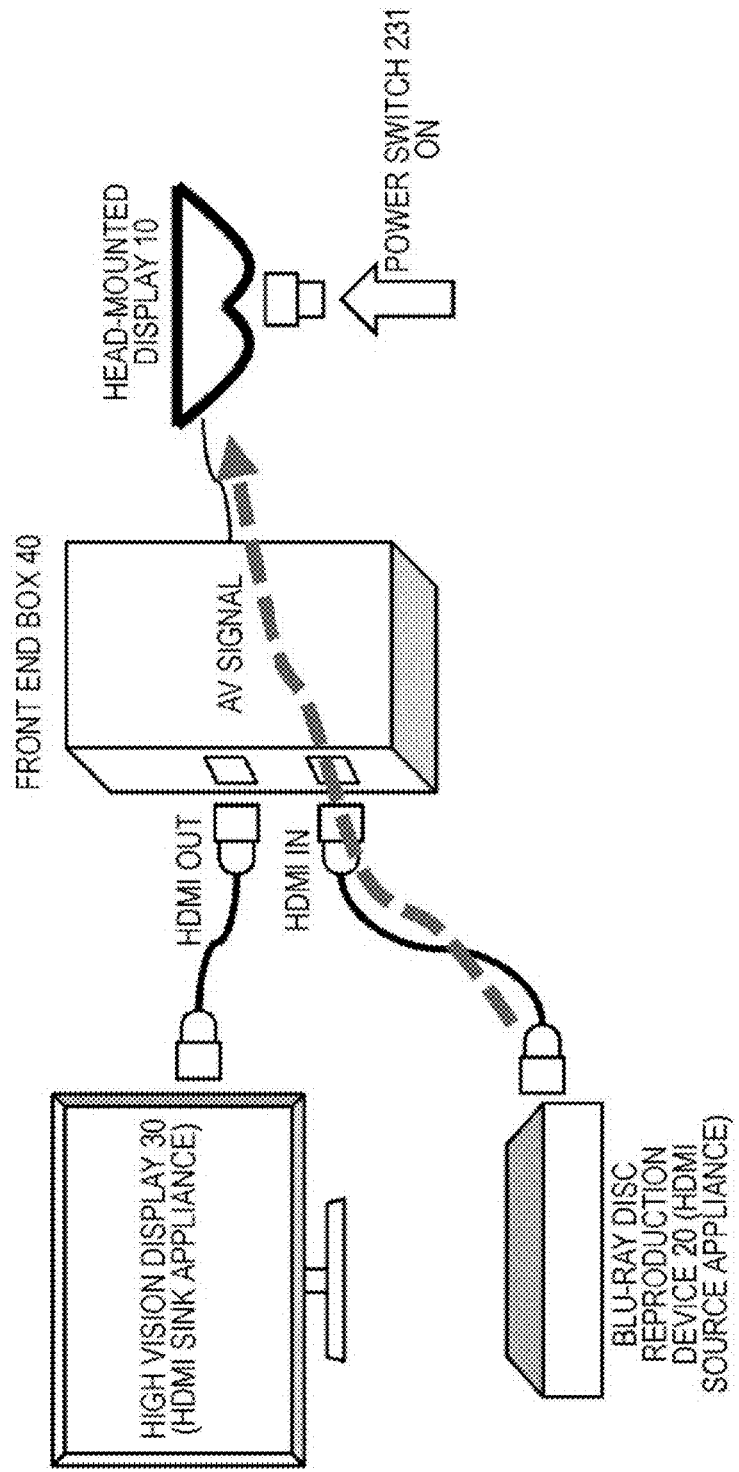
FIG. 19A is a diagram for describing a mechanism for causing a power state of the head-mounted display 10 and output switching by an output switching unit 504 to be in conjunction with each other.

As shown in FIG. 19A, when the power switch 231 is operated and the power of the head-mounted display 10 is turned on, the front end box 40 outputs, exclusively to the head-mounted display 10, the AV signals reproduced and output by the Blu-ray disc reproduction device 20.

Here, while the AV signals are being output to the head-mounted display 10, the front end box 40 assumes at the output switching unit 504 the same state as where the HDMI cable at the high vision display 30 is unplugged. As a result, the high vision display 30 will be not be seen by the Blu-ray disc reproduction device 20 on the HDMI interface.

Figure 19B:
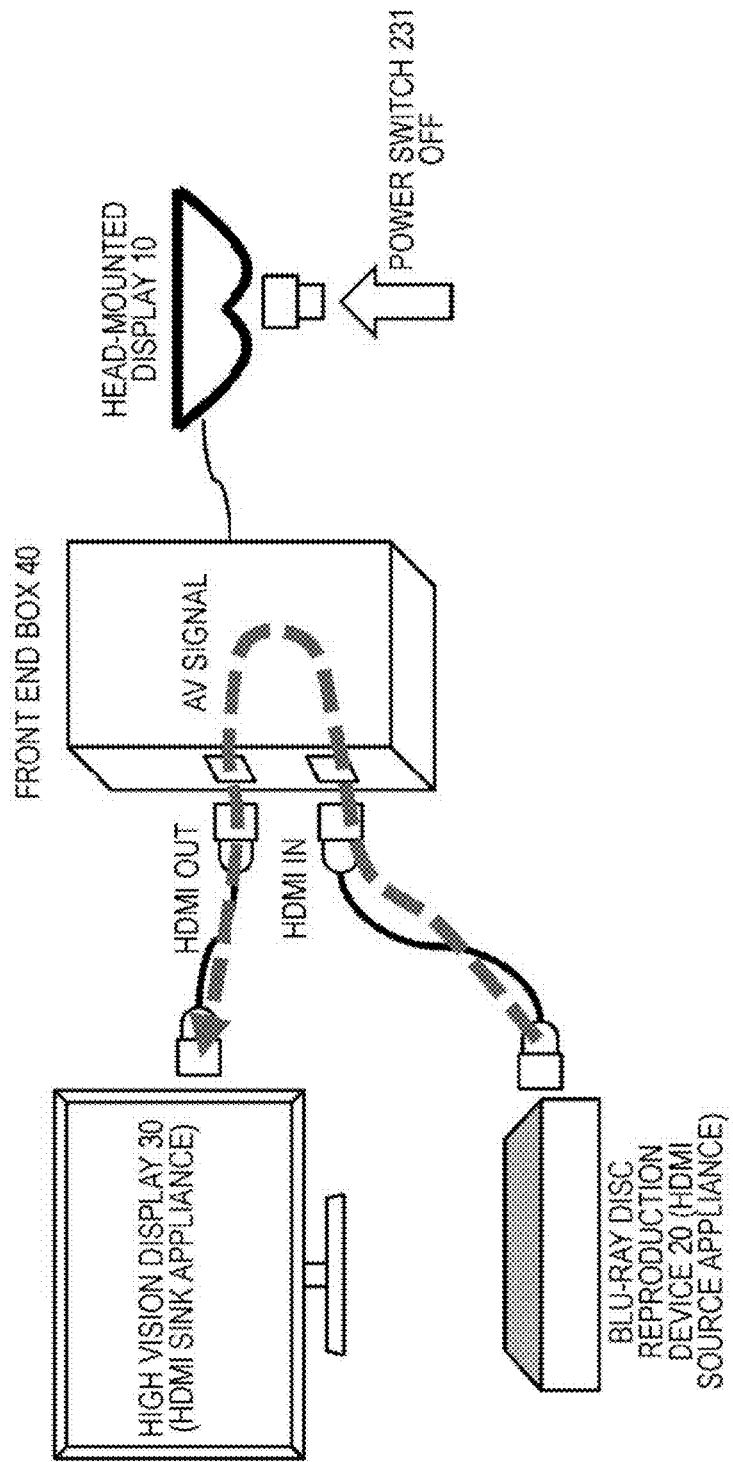
FIG. 19B is a diagram for describing a mechanism for causing a power state of the head-mounted display 10 and output switching by the output switching unit 504 to be in conjunction with each other.

Subsequently, when the power switch 231 is operated and the power of the head-mounted display 10 is turned off (standby state) as shown in FIG. 19B, the front end box 40 stops output of the AV signals to the head-mounted display 10, and instead, switches the output of the AV signals to the high vision display 30.

Also, while the AV signals are being output to the high vision display 30, the front end box 40 assumes at the output switching unit 504 the same state as where the HDMI cable at the head-mounted display 10 is unplugged. As a result, a state is achieved where the Blu-ray disc reproduction device 20 will not see the head-mounted display 10 but will see the high vision display 30 instead on the HDMI interface.

H. Output Switching by Front End Box (2)

In the example system configuration shown in FIG. 1, AV signals output from the Blu-ray disc reproduction device 20, which is an HDMI source appliance, are transferred to the high vision display 30 corresponding to an HDMI sink appliance by the front end box 40 corresponding to an HDMI repeater.

On the other hand, as described above, the front end box 40 is also a two-output switcher that places the highest priority on the output to the head-mounted display 10. While the AV signals are output exclusively to the head-mounted display 10, the high vision display 30 may be in a standby state, or the power of the high vision display 30 may be turned off, or the high vision display 30 may not be connected in the first place.

Here, if the front end box 40 is to realize the HDMI repeater function with respect to the high vision display 30, power has to be supplied at all times to a circuit portion for repeating the HDMI signal, and this may result in the increase in the power consumption during the standby for output to the high vision display 30 as an HDMI source appliance.

Accordingly, in the present embodiment, the front end box 40 only supplies power to a circuit portion for monitoring the connection state of an HDMI source appliance and an HDMI sink source while the output to the high vision display 30 as an HDMI source appliance is in standby. Thus, power is supplied to an HDMI repeater function circuit only when an HDMI appliance is connected to the front end box 40 as an HDMI repeater, and the power consumption at the time of standby may be suppressed.

Figure 20:
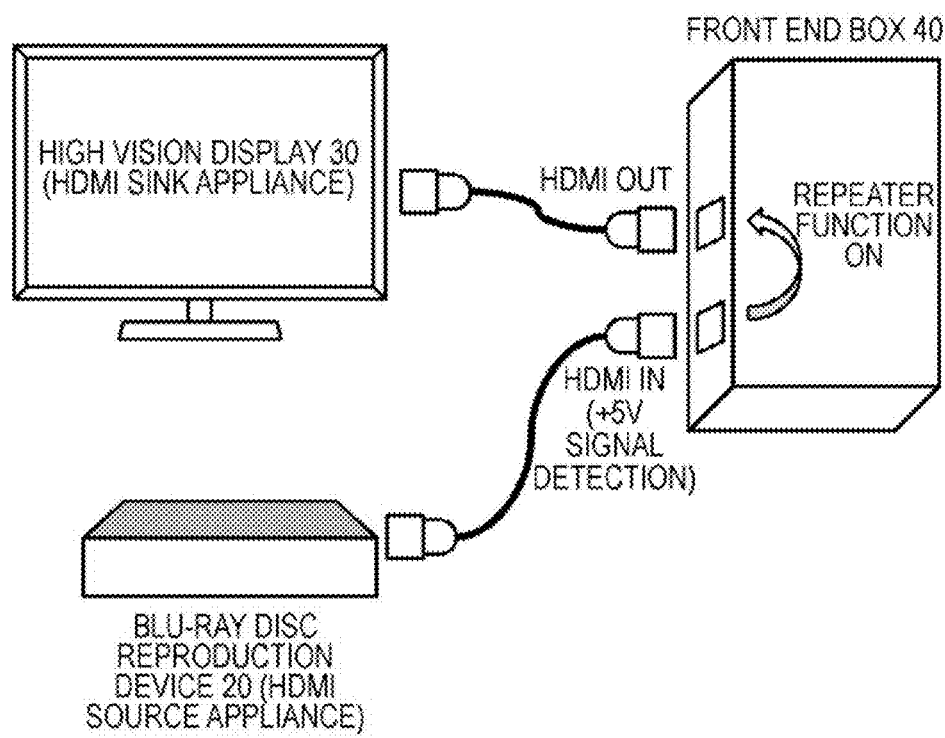
FIG. 20 is a diagram showing a front end box 40 detecting a +5V signal emitted from an HDMI source appliance, and enabling an HDMI repeater function.

For example, a connection monitoring circuit in the front end box 40 monitors a +5V signal of a source appliance that is HDMI-connected to the HDMI input unit 501. Then, when the Blu-ray disc reproduction device 20, which is an HDMI source appliance, is connected by an HDMI cable to the HDMI input unit 501, the connection monitoring circuit in the front end box 40 detects a +5V signal emitted from the HDIM source appliance from a signal line included in the cable, and enables the repeater function with respect to an HDMI sink appliance (see FIG. 20). Also, in the case a +5V signal is not detected, the repeater function is disabled with respect to the HDMI sink appliance, and the power consumption at the time of standby is suppressed.

Figure 21:
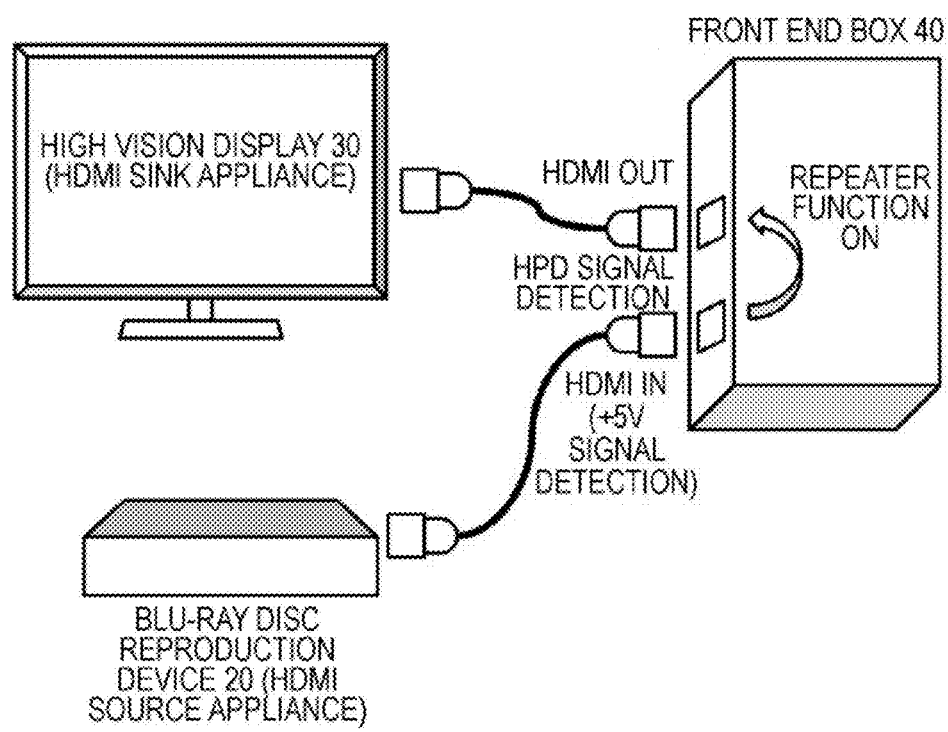
FIG. 21 is a diagram showing the front end box 40 detecting both a +5V signal emitted from an HDMI source appliance and an HPD signal emitted from an HDMI sink appliance, and enabling the HDMI repeater function.

Alternatively, the connection monitoring circuit in the front end box 40 monitors both a +5V signal of a source appliance that is HDMI-connected to the HDMI input unit 501, and an HPD (Hot Plug Detect) signal of a sink appliance that is HDMI-connected to the second output unit 503. Then, only when an HPD signal emitted by the HDMI sink appliance is detected together with a +5V signal emitted by the HDIM source appliance does the connection monitoring circuit in the front end box 40 enables the repeater function with respect to the HDMI sink appliance (see FIG. 21). If one of the signals is not detected, the repeater function is disabled, and the power consumption at the time of standby is suppressed.

INDUSTRIAL APPLICABILITY

Heretofore, the present invention has been described in detail with reference to a specific embodiment. However, it is obvious that those skilled in the art may attain modifications and alterations of the relevant embodiment within the scope not departing from the gist of the present invention.

In the present specification, an embodiment where the present invention is applied to the head-mounted display has been mainly described, but the gist of the present invention is not limited to the configuration of a specific head-mounted display. The present invention may be similarly applied to various types of display systems for forming a virtual image on the retina of the eye of a user.

In short, the present invention has been disclosed in the form of exemplifications, and the described contents of the present specification should not be construed in a limited manner. In order to determine the gist of the present invention, the scope of the claims should be considered.

REFERENCE SIGNS LIST

10 Head-mounted display
20 Blu-ray disc reproduction device

30 High vision display
40 Front end box
102 Forehead support
141 Tact switch
142 Rotation shaft
143 Arm
144 Spring
201 Signal transmission/reception unit
202 Signal processor
203 VRAM
204 Panel controller
205 ROM
206 CPU
208L, 208R Display unit
209 ROM
210 RAM
211 Audio DAC
212L, 212R Headphone
220 User operation unit
221 Mounting sensor
222 Accelerometer
223 Brightness sensor
230 Power source unit
231 Power switch
301 Housing
302 Display unit portion
303L, 303R Headphone portion
304 Forehead support
305 Head band, 305A Upper band, 305B Lower band
401L, 401R Display panel
402L, 402R Optical system
501 HDMI input unit
502 First output unit
503 Second output unit
504 Output switching unit
505 Audio DAC
506 Control unit
507 HP connector
509 User operation unit

The invention claimed is:

1. A display system comprising:
an image information supply device for supplying image information;
a first display device for being mounted on and for being used by a user, the first display device having a power switch associated therewith for turning on or off power to the first display device;
a second display device; and
an output switching device coupled to the first display device and the second display device, and for outputting the image information supplied by the image information supply device preferentially to the first display device, the output switching device comprising a repeater function circuit for supplying the image information to the second display device,
in which the output switching device is configured to automatically switch outputting of the image information supplied by the image information supply device from the first display device to the second display device when the output switching device detects that the power switch associated with the first display device has been used to turn off the power to the first display device while the first display device remains coupled to the output switching device,
wherein when the image information is output exclusively to the first display device the output switching device does not supply power to the repeater function circuit.

* * * * *